(12) United States Patent
Ellis et al.

(10) Patent No.: US 10,454,771 B2
(45) Date of Patent: Oct. 22, 2019

(54) VIRTUAL INFRASTRUCTURE

(71) Applicant: Alcatel-Lucent Canada Inc., Ottawa (CA)

(72) Inventors: Don R. Ellis, Ottawa (CA); Sylvain Chenard, Gatineau (CA); Martin M. Charbonneau, Gatineau (CA)

(73) Assignee: Alcatel Lucent, Nozay (FR)

( * ) Notice: Subject to any disclaimer, the term of this patent is extended or adjusted under 35 U.S.C. 154(b) by 552 days.

(21) Appl. No.: 15/092,058

(22) Filed: Apr. 6, 2016

(65) Prior Publication Data

US 2017/0295066 A1    Oct. 12, 2017

(51) Int. Cl.
G06F 15/173    (2006.01)
H04L 12/24    (2006.01)
H04L 12/931    (2013.01)

(52) U.S. Cl.
CPC .......... *H04L 41/12* (2013.01); *H04L 41/5041* (2013.01); *H04L 49/70* (2013.01)

(58) Field of Classification Search
USPC .................. 709/226, 217, 212, 214, 224
See application file for complete search history.

(56) References Cited

U.S. PATENT DOCUMENTS

| 4,949,254 A | 8/1990 | Shorter |
| 6,111,673 A | 8/2000 | Chang |

(Continued)

FOREIGN PATENT DOCUMENTS

| WO | WO 2016/048430 A | 3/2016 |
| WO | WO 2016/050270 A1 | 4/2016 |

OTHER PUBLICATIONS

Gill, Bob, "The Edge Manifesto: Digital Business, Rich Media. Latency Sensitivity and the Use of Distributed Data Centers," ID:G00290109, Jul. 31, 2015, downloaded from http://www.equinix.com/resources/analyst-reports/gartner-the-edge-manifesto/, 8 pages.

(Continued)

*Primary Examiner* — Lan Dai T Truong
(74) *Attorney, Agent, or Firm* — Tong, Rea, Bentley & Kim, LLC

(57) ABSTRACT

The present disclosure generally discloses a network infrastructure virtualization mechanism configured to support virtualization of the network infrastructure (NI) of a communication network to provide thereby a virtualized infrastructure (VI) for the communication network. The network infrastructure virtualization mechanism may be configured to support virtualization of infrastructure resources (IRs) of the network infrastructure to provide virtualized infrastructure resources (VIRs) of the network infrastructure. The IRs of the communication network may include network resources (NRs) which may be virtualized to provide virtualized network resources (VNRs) and service resources (SRs) which may be virtualized to provide virtualized service resources (VSRs). The network infrastructure virtualization mechanism may be configured to support multi-owner virtualization such that multiple owners may share portions of the network infrastructure of the communication network and multi-tenant virtualization such that multiple tenants, at one or more hierarchical layers, may share portions of the network infrastructure of the communication network.

21 Claims, 18 Drawing Sheets

(56) References Cited

U.S. PATENT DOCUMENTS

| | | | |
|---|---|---|---|
| 7,839,766 | B1 | 11/2010 | Gardner |
| 8,400,355 | B1 | 3/2013 | Gaeta |
| 8,484,353 | B1 | 7/2013 | Johnson et al. |
| 9,392,471 | B1* | 7/2016 | Thomas ............ H04W 36/0083 |
| 9,780,909 | B2 | 10/2017 | Wood |
| 2005/0053375 | A1 | 3/2005 | Yoo |
| 2005/0132367 | A1 | 6/2005 | Tewari |
| 2007/0016904 | A1 | 1/2007 | Adlung et al. |
| 2008/0244579 | A1 | 10/2008 | Muller |
| 2008/0244595 | A1 | 10/2008 | Eilam |
| 2011/0106802 | A1 | 5/2011 | Pinkney |
| 2011/0170860 | A1 | 7/2011 | Smith et al. |
| 2011/0318004 | A1 | 12/2011 | Bruno et al. |
| 2012/0110055 | A1* | 5/2012 | Van Biljon ............ G06Q 30/04 709/201 |
| 2012/0158938 | A1 | 6/2012 | Shimonishi et al. |
| 2012/0281979 | A1 | 11/2012 | Xia et al. |
| 2013/0046906 | A1 | 2/2013 | Ripberger |
| 2013/0055261 | A1 | 2/2013 | Han et al. |
| 2014/0052877 | A1* | 2/2014 | Mao ...................... H04L 61/103 709/245 |
| 2014/0086576 | A1 | 3/2014 | Campbell et al. |
| 2014/0330869 | A1 | 11/2014 | Factor et al. |
| 2014/0334817 | A1 | 11/2014 | Miedema |
| 2015/0082301 | A1 | 3/2015 | Garg et al. |
| 2015/0237421 | A1 | 8/2015 | Morgan et al. |
| 2015/0324182 | A1* | 11/2015 | Barros ...................... G06F 8/61 717/174 |
| 2016/0134364 | A1 | 5/2016 | Grobe et al. |
| 2016/0335113 | A1* | 11/2016 | Gorst .................. G06F 9/45558 |
| 2016/0364226 | A1 | 12/2016 | Takano et al. |
| 2017/0019345 | A1* | 1/2017 | Yamasaki ................. G06F 9/46 |
| 2017/0060628 | A1* | 3/2017 | Tarasuk-Levin ...... G06F 9/4856 |
| 2017/0132744 | A1* | 5/2017 | Wilt .......................... G06T 1/20 |
| 2017/0134089 | A1 | 5/2017 | Mansouri Rad et al. |
| 2017/0161044 | A1* | 6/2017 | Singh .................... G06F 9/5083 |
| 2017/0230257 | A1 | 8/2017 | Bruun |
| 2017/0324620 | A1 | 11/2017 | Ellis et al. |
| 2018/0006931 | A1 | 1/2018 | Ellis et al. |
| 2018/0041914 | A1* | 2/2018 | Zhang .................. H04W 28/08 |
| 2018/0234308 | A1* | 8/2018 | Bruun ................. H04L 41/5054 |

OTHER PUBLICATIONS cellmapper.net, "Cellular Coverage and Tower Map," downloaded on Feb. 9, 2017 from https://www.cellmapper.net/map, 1 page.

datacentermap.com, "Data Center Map," downloaded on Feb. 9, 2017 from http://www.datacentermap.com/france/paris/, 16 pages.

Interoute, "Dark Fibre Network Provider, DWDM Network," downloaded on Feb. 9, 2017 from http://www.interoute.com/product/dark-fibre-network, 8 pages.

Vodofone, "Vodofone Ethernet Product overview," downloaded on Feb. 9, 2017 from http://www.vodafone.com/business/carrier-services, 2 pages.

Dix, John, "Inside AT&T's grand plans for SDN", Jan. 8, 2015, downloaded from http://www.networkworld.com/article/2866439/sdn/inside-atts-grand-plans-for-sdn.html, 8 pages.

Ovum, "Telecoms, Media & Entertainment Outlook 2015," downloaded from http://info.ovum.com/uploads/files/Ovum_Telecoms_Media_and_Entertainment_Outlook_2015.pdf on Feb. 9, 2017, 7 pages.

Data Center Knowledge, "Equinix CEO Unveils Aggressive Plan to Court Enterprises", downloaded from http://www.datacenterknowledge.com/archives/2016/01/08/equinix-ceo-unveils-aggressive-plan-to-court-enterprises/ on Feb. 9, 2017, 4 pages.

Crown Castle, "Outdoor Small Cell Solutions," downloaded from http://www.crowncastle.com/ on Mar. 21, 2017, 3 pages.

Zayo Group, "Mobile Infrastructure, Scalable bandwidth for wireless providers," downloaded from http://www.zayo.com/services/mobile-infrastructure on Feb. 9, 2017, 7 pages.

Verizon, "Verizon Enterprise Solutions," downloaded from http://www.verizonenterprise.com/about/ Feb. 9, 2017, 3 pages.

Equinix, "Syniverse Success Story", downloaded from http://www.equinix.com/industries/mobile/ on Feb. 9, 2017, 5 pages.

NGMN Alliance, "RAN Evolution Project—Backhaul and Fronthaul Evolution," v1.01 Mar. 31, 2015, 28 pages.

NGMN Alliance, "Fronthaul Requirements for C-RAN," v1.0 Mar. 31, 2015, 11 pages.

NGMN Alliance, "Suggestions on Potential Solutions to C-RAN," v4.0 Jan. 3, 2013.

International Search Report and Written Opinion, mailed in corresponding PCT Application No. PCT/IB2017/000500, dated Aug. 28, 2017, 9 pages.

Munoz, et al., "An experimental switching-aware GMPLS-based lightpath provisioning protocol in wavelength-routed networks," Photonic Network Communications, Kluwer Academic Publishers, BO, vol. 14, No. 3, Jul. 13, 2017, pp. 253-264, XP019532832.

Jukan, et al., "Constraint-based path selection methods for on-demand provisioning in WDM networks", IEEE INFOCOM 2002, vol. 2, Jan. 1, 2002, pp. 827-836, XP002428368.

Freiberger, et al., "Low Latency Optical Services," Optical Fiber Communication Conference and Exposition (OFC/NFOEC), 2012, and the National Fiber Optic Engineers Conference, IEEE, Mar. 4, 2012, pp. 1-3, XP032340399.

Charbonneau, et al., "A Survey of Advance Reservation Routing and Wavelength Assignment in Wavelength-Routed WDM Networks," IEEE Communications Surveys and Tutorials, Institute of Electrical and Electronics Engineers, US, vol. 14, No. 4, Oct. 1, 2012, pp. 1037-1064, XP011471436.

* cited by examiner

NR DATA STRUCTURE 610

| NE | TYPE | CARD | TYPE | PORT | TYPE | REACH | REMOTE | NR STATE |
|---|---|---|---|---|---|---|---|---|
| 128000 | 16 | 64 | 16 | 32 | 16 | 4 | 4 | 4 |
| NE ID | ROADM PE<br>ROADM P<br>ILA<br>L1 MUX<br>L2 MUX | CARD ID | ETHERNET<br>MULTI-PROTOCOL<br>-Eth, FC, IB, CPRI<br>OTN<br>Amp | PORT ID | 100M<br>1G<br>10G<br>100G | SR<br>IR<br>LR | NID<br>SFP<br>CLE<br>CPE | IS - IN SERVICE<br>OOS - OUT-OF-SERVICE<br>-AU (DEGRADE)<br>-AU (FAIL) |

| LOCATION | GPS | CONTACT & # |
|---|---|---|
| POSTAL ADDRESS | | |
| POSTAL ADDRESS | LAT/LONG | NAMES: NUMBER (S) |

| HISTORY | CHANGE | EXPANSION |
|---|---|---|
| 128 | 16 | 64 |
| NETWORK NOTES:<br>YEAR NE INSTALLED<br>YEAR IS | FAULTS | |

| NETWORK | TYPE | EXPANSION |
|---|---|---|
| 128 | 16 | 64 |
| NETWORK ID<br>CITY / REGION | IN TERRITORY/OOT<br>DEDICATED<br>SHARED | |

FIG. 6A

SR DATA STRUCTURE 710

| SERVICES | UNI/NNI | PROTOCOL TYPE | SERVICE TYPE | EVC | WVC | SOURCE ADDRESS | DESTINATION ADDRESS | SR STATE |
|---|---|---|---|---|---|---|---|---|
| 512000 | 4 | 8 | 4 | 8 | 8 | X | X | 8 |
| SERVICE ID | UNI, UNIm NNI, NNIm | ETHERNET (MEF, RT, W) MULTI-PROTOCOL (WAVE) -Eth, FC, IB, CPRI WAVE, SUB-WAVE SDH | E-LINE E-TREE E-LAN W-LINE | FIXED DYNAMIC UNPROTECTED PROTECTED | | LOCATION A | LOCATION Z | IS - IN SERVICE OOS - OUT-OF-SERVICE -AU (DEGRADE) -AU (FAIL) |

| SLA | RATE | CIR | EIR |
|---|---|---|---|
| 128 | 16 | 16 | 16 |
| SLA -A,D, DV QOS | 100M 1G 10G 100G | | |

| BILLING | CUSTOMER ID | CONTACT & # |
|---|---|---|
| POSTAL ADDRESS | | |
| POSTAL ADDRESS | ACCOUNT# | NAMES: NUMBER(S) |

| HISTORY | CHURN | EXPANSION |
|---|---|---|
| 128 | 16 | 64 |
| SERVICE NOTES: SR YEAR NE INSTALLED IS YEAR IS OOS TIME (DMY) | | |

| SERVICE AREA | TYPE | EXPANSION |
|---|---|---|
| 128 | 16 | 64 |
| AREA CODE ID CITY / REGION | IN TERRITORY/OOT DEDICATED SHARED | |

FIG. 7A

VNR ADMINISTRATION POLICY 1010

VNR OPERATIONS
R=REQUEST
P=PROVISION
TS-IS=TROUBLE SHOOT IN SERVICE
TS-OSS=TROUBLE SHOOT OUT-OF-SERVICE
V=VIEW

CUSTOMER CAN
TS-IS=TROUBLE SHOOT IN SERVICE
V=VIEW

| VIRTUAL NETWORK RESOURCE ALLOCATION | VNR MULTI-TENANT HIERARCHY | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | NOC ADMIN L1 | | | | | OWNER SP-1 | | | | | SP1 WHOLESALE BU | | | | | PARTNER | | | | | CUSTOMER | | | | | END-USER | | | | |
| VNR ADMIN | R | P | T-IS | T-OSS | V | R | P | T-IS | T-OSS | V | R | P | T-IS | T-OSS | V | R | P | T-IS | T-OSS | V | R | P | T-IS | T-OSS | V | R | P | T-IS | T-OSS | V |
| NOC ADMIN LEVEL 1 | X | X | X | X | X | X | X | X | X | X | X | X | X | X | X | X | X | X |   |   | X | X | X | X | X | X | X | X | X | X |
| OWNER SP-1 |   |   |   |   |   | X | X | X | X | X | X | X | X | X | X |   | X | X |   |   |   | X | X |   |   |   | X | X |   |   |
| BUSINESS UNIT |   |   |   |   |   |   |   |   |   |   | X | X | X | X | X |   |   | X |   |   |   |   | X |   |   |   |   | X |   |   |
| PARTNER |   |   |   |   |   |   |   |   |   |   |   |   |   |   |   | X | X | X | X | X |   |   | X |   |   |   |   | X |   |   |
| CUSTOMER |   |   |   |   |   |   |   |   |   |   |   |   |   |   |   |   |   |   |   |   | X | X | X | X | X |   |   | X |   |   |
| END USER |   |   |   |   |   |   |   |   |   |   |   |   |   |   |   |   |   |   |   |   |   |   |   |   |   | X | X | X | X | X |

VSR ADMINISTRATION POLICY 1020

VSR OPERATIONS
R=REQUEST
P=PROVISION
TS-IS=TROUBLE SHOOT IN SERVICE
TS-OSS=TROUBLE SHOOT OUT-OF-SERVICE
V=VIEW

| VIRTUAL SERVICE RESOURCE ALLOCATION | VSR MULTI-TENANT HIERARCHY | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | SP NETWORK OPERATIONS | | | | | SP RETAIL BU | | | | | SP WHOLESALE BU | | | | | WHOLESALE PARTNER | | | | | WHOLE PARTNER'S CUST | | | | | WHOLE PART CUST'S USER | | | | |
| | R | P | T-IS | T-OSS | V | R | P | T-IS | T-OSS | V | R | P | T-IS | T-OSS | V | R | P | T-IS | T-OSS | V | R | P | T-IS | T-OSS | V | R | P | T-IS | T-OSS | V |
| VSR ADMIN | x | x | x | x | x | | | | | | | | | | | | | | | | | | | | | | | | | |
| SOC ADMIN LEVEL 1 | | | | | | x | x | x | x | x | x | x | x | x | x | x | x | x | x | x | x | x | x | x | x | x | x | x | x | x |
| OWNER SP-1 | | | | | | x | | x | x | x | x | | x | x | x | x | | x | x | x | x | | x | x | x | x | | x | x | x |
| BUSINESS UNIT | | | | | | | | x | x | x | | | x | x | x | | | x | x | x | | | x | x | x | | | x | x | x |
| PARTNER | | | | | | | | | | | | | | | | | | | | x | | | x | x | x | | | x | x | x |
| CUSTOMER | | | | | | | | | | | | | | | | | | | | | x | | | | x | | | | | x |
| END USER | | | | | | | | | | | | | | | | | | | | | | | | | | | | | | x |

CUSTOMER CAN
R=REQUEST
TS-IS=TROUBLE SHOOT IN SERVICE
V=VIEW

VIRTUAL INFRASTRUCTURE

TECHNICAL FIELD

The disclosure relates generally to the field of communication networks and, more particularly but not exclusively, to infrastructure virtualization within the context of communication networks.

BACKGROUND

Various techniques are being applied for improving various aspects of communication networks. For example, Software Defined Networking (SDN) is being employed to provide separation of the control and data planes of communication networks, Network Function Virtualization (NFV) is being applied for virtualizing various functions of communication networks, and so forth. However, while such techniques may provide various benefits for communication networks, such techniques may not be able to provide certain type of features for communication networks.

SUMMARY

The present disclosure generally discloses mechanisms related to virtualization of network infrastructure of a communication network.

In at least some embodiments, an apparatus includes a processor and a memory communicatively connected to the processor. The processor is configured to receive infrastructure information describing infrastructure resources of a network infrastructure of a communication network, wherein the infrastructure resources include network resources and service resources. The processor is configured to process the infrastructure information, based on a set of infrastructure virtualization data structures, to provide virtualized infrastructure information describing virtualized infrastructure resources of a virtualized network infrastructure of the communication network, wherein the virtualized infrastructure resources include virtualized network resources representing virtualization of the network resources and virtualized service resources representing virtualization of the service resources. The processor is configured to manage the virtualized infrastructure resources based on the virtualized infrastructure information describing the virtualized infrastructure resources.

In at least some embodiments, a non-transitory computer-readable storage medium stores instructions which, when executed by a processor, cause the processor to perform a method. The method includes receiving infrastructure information describing infrastructure resources of a network infrastructure of a communication network, wherein the infrastructure resources include network resources and service resources. The method includes processing the infrastructure information, based on a set of infrastructure virtualization data structures, to provide virtualized infrastructure information describing virtualized infrastructure resources of a virtualized network infrastructure of the communication network, wherein the virtualized infrastructure resources include virtualized network resources representing virtualization of the network resources and virtualized service resources representing virtualization of the service resources. The method includes managing the virtualized infrastructure resources based on the virtualized infrastructure information describing the virtualized infrastructure resources.

In at least some embodiments, a method is provided. The method includes receiving infrastructure information describing infrastructure resources of a network infrastructure of a communication network, wherein the infrastructure resources include network resources and service resources. The method includes processing the infrastructure information, based on a set of infrastructure virtualization data structures, to provide virtualized infrastructure information describing virtualized infrastructure resources of a virtualized network infrastructure of the communication network, wherein the virtualized infrastructure resources include virtualized network resources representing virtualization of the network resources and virtualized service resources representing virtualization of the service resources. The method includes managing the virtualized infrastructure resources based on the virtualized infrastructure information describing the virtualized infrastructure resources.

In at least some embodiments, a management system includes a processor and a memory communicatively connected to the processor. The processor is configured to receive, by the management system from an infrastructure virtualization system, a first message comprising a virtualized infrastructure resource data structure comprising virtualized infrastructure resource information for a virtualized infrastructure resource hosted by a network element of a communication network, the virtualized infrastructure resource data structure identifying a set of entities including an owner of the virtualized infrastructure resource and at least one tenant of the virtualized infrastructure resource, the virtualized infrastructure resource comprising a virtualized network resource or a virtualized service resource. The processor is configured to propagate, from the management system toward the network element based on the first message, a second message including at least a portion of the virtualized infrastructure resource information for the virtualized infrastructure resource hosted by the network element.

In at least some embodiments, a network element includes a processor and a memory communicatively connected to the processor. The processor is configured to receive, from a network system, a message comprising a virtualized infrastructure resource data structure comprising virtualized infrastructure resource information for a virtualized infrastructure resource hosted by the network element, the virtualized infrastructure resource data structure identifying a set of entities including an owner of the virtualized infrastructure resource and at least one tenant of the virtualized infrastructure resource, the virtualized infrastructure resource comprising a virtualized network resource or a virtualized service resource. The processor is configured to initiate configuration of the network element based on the virtualized infrastructure resource information for the virtualized infrastructure resource hosted by the network element.

BRIEF DESCRIPTION OF THE DRAWINGS

The teachings herein can be readily understood by considering the following detailed description in conjunction with the accompanying drawings, in which:

FIGS. 6A and 6B depict a network resource data structure and an associated virtualized network resource data structure;

FIGS. 7A and 7B depict a service resource data structure and an associated virtualized service resource data structure;

FIGS. 10A and 10B depict exemplary administration policies for virtualized infrastructure resources;

To facilitate understanding, identical reference numerals have been used, where possible, to designate identical elements that are common to the figures.

DETAILED DESCRIPTION

Figure 1:
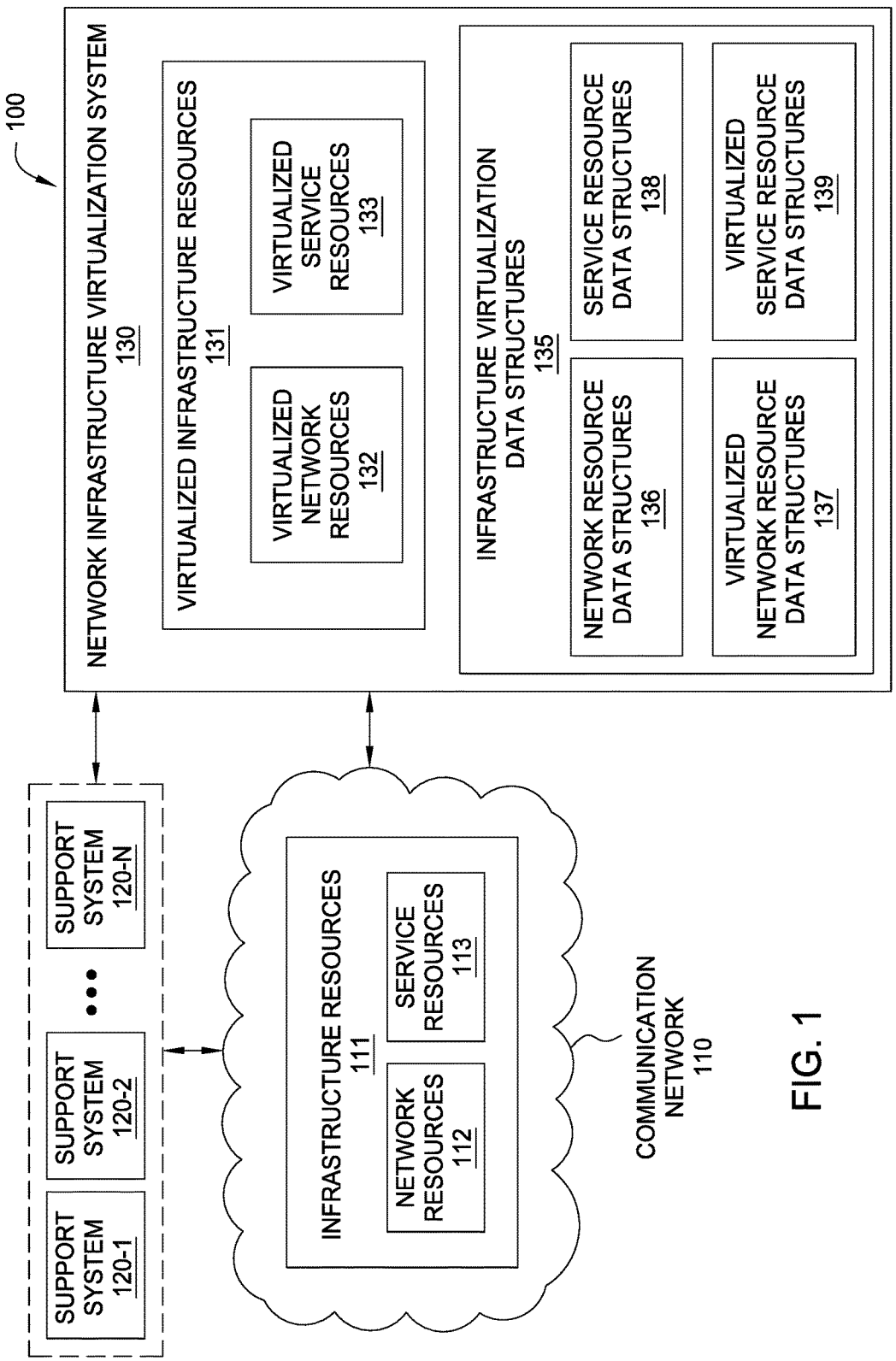
FIG. 1 depicts a system configured to support network infrastructure virtualization to provide a virtualized infrastructure for a communication network.

The present disclosure generally discloses a network infrastructure virtualization mechanism configured to support virtualization of the network infrastructure (NI) of a communication network (CN) to provide thereby a virtualized network infrastructure (VNI) for the CN. The network infrastructure virtualization mechanism may be configured to support virtualization of infrastructure resources (IRs) of the NI to provide thereby virtualized infrastructure resources (VIRs) of the NI. The IRs of the CN may include network resources (NRs) which may be virtualized to provide virtualized NRs (VNRs), service resources (SRs) which may be virtualized to provide virtualized SRs (VSRs), or the like, as well as various combinations thereof. The virtualization of IRs of the NI to provide VIRs may be considered to provide infrastructure slices of VIRs which may be managed in various ways. The virtualization of IRs of the NI to provide VIRs may be performed using various types of virtualization, such as resource management based virtualization, resource ownership based virtualization, resource allocation based virtualization, resource administration based virtualization, resource analytics based virtualization, or the like, as well as various combinations thereof. The network infrastructure virtualization mechanism may be configured to support multi-owner virtualization such that multiple owners may share portions of the NI of the CN (e.g., different owners may be provided ownership of respective sets of VNRs or VSRs which share portions of the NI of the CN). The network infrastructure virtualization mechanism may be configured to support multi-tenant virtualization such that multiple tenants, at multiple hierarchical levels, may share portions of the NI of the CN (e.g., tenants are allocated respective sets of VNRs or VSRs, which may overlap across hierarchal levels, which share portions of the NI of the CN). The network infrastructure virtualization mechanism may be configured to support virtualization of IRs of the NI of the CN by receiving IR information describing the IRs of the NI and processing the IR information, based on infrastructure virtualization data structures, to provide virtualized IR information describing the VIRs of the VNI (e.g., indicating hierarchical management of IRs by owners and tenants, indicating ownership of IRs by owners, indicating hierarchical allocation of IRs to tenants, indicating hierarchical administration of IRs by tenants, or the like, as well as various combinations thereof). The network infrastructure virtualization mechanism may be configured to support resource management, ownership, allocation, and administration. The network infrastructure virtualization mechanism may be configured to support applications that enable virtualized network and service functions and features per tenant (e.g., the tenants may have customized resource applications configured to enable the respective tenants to manage and monetize virtualized infrastructure). The network infrastructure virtualization mechanism may be configured to support various types of data analytics, which may be used for various purposes, based on the hierarchical management, ownership, allocation, and administration of resources. In this sense, as noted above, virtualization of NI to provide VNI may include virtualization of IRs of the NI in terms of management, ownership, allocation, administration, and so forth, thereby allowing secure sharing of IRs in various ways and for various purposes. The network infrastructure virtualization mechanism may be configured to support virtualization of IRs of the NI from ownership through administration (and encompassing various other operations, administration, maintenance (OAM) functions, as well as various other types of functions, in between). These and various other embodiments and potential advantages of network infrastructure virtualization mechanism may be further understood by way of reference to FIG. 1.

FIG. 1 depicts a system configured to support network infrastructure virtualization to provide a virtualized infrastructure for a communication network.

The system 100 includes a communication network (CN) 110, a set of support systems (SSs) 120-1-120-N (collectively, SSs 120), and a network infrastructure virtualization system (NIVS) 130.

The CN 110 may be any type of communication network for which network infrastructure virtualization may be supported. For example, CN 110 may be an optical network supporting Ethernet-based services, an optical network supporting IP-based services, a wireless network supporting various communication services, or the like. Accordingly, it will be appreciated that, although primarily depicted and described herein, for purposes of clarity, within the context of embodiments in which CN 110 is a dense wavelength divisional multiplexing (DWDM) optical network supporting Ethernet-based services, infrastructure virtualization may be provided for various other types of communication networks.

The CN 110 includes various resources which may be virtualized using network infrastructure virtualization. The CN 110 includes infrastructure resources (IRs) 111. The IRs 111 include various network resources (NRs) 112 configured to support various service resources (SRs) 113.

The NRs 112 may include various types of network resources, which may vary for different types of communication networks. For example, the NRs 112 may include packet network resources (e.g., routers, switches, hubs, interfaces, connections, sessions, or the like, as well as various combinations thereof). For example, the NRs 112 may include circuit network resources (e.g., telephone network resources, switches, ports, connections, or the like, as well as various combinations thereof). For example, the NRs 112 may include optical network resources (e.g., switches, ports, wavelengths (As), transponders, muxponders, reconfigurable optical add-drop multiplexers (ROADMs), intermediate line amplifiers (ILAs), or the like, as well as various combinations thereof). The NRs 112 may include OSS management functions and features (e.g., which may be referred to as Fault, Configuration, Accounting, Performance, and Security (FCAPS), which generally includes network inventory, network OAM including KPIs, or the like). The NRs 112 may include various other types of network resources.

The SRs 113 may include various types of service resources, which may vary for different types of communication networks. For example, the SRs 113 may include client ports (e.g., user-network interfaces (UNIs)), line ports (e.g., network-network interfaces (NNIs)), Ethernet services (e.g., point-to-point Ethernet services, point-to-multipoint Ethernet services, or the like), Ethernet virtual connections (EVCs), wavelength virtual connections (WVCS), or the like, as well as various combinations thereof. The SRs 113 may include BSS management functions and features (e.g., which may be referred to as Fulfillment, Assurance, and Billing (FAB), which generally includes network service inventory, service OAM including SLAs, or the like). The SRs 113 may include various other types of service resources.

The CN 110 may include various devices and elements (omitted for purposes of clarity) configured to provide the IRs 111. These devices and elements maintain various types of information related to CN 110, including various types of information describing NRs 112 of CN 110 (e.g., equipment identifiers of nodes, port identifiers of ports, interface identifiers, wavelength identifiers of wavelengths, communication link identifiers of communication links, network topology information describing interconnection of communication elements such as nodes and links, or the like, as well as various combinations thereof), various types of information describing SRs 113 of CN 110 (e.g., service identifiers of services, service endpoint identifiers of services, service characteristics information describing characteristics of services, or the like, as well as various combinations thereof), or the like, as well as various combinations thereof.

The CN 110 may maintain various types of information produced as a result of virtualization of the IRs 111 of CN 110. For example, network elements of CN 110 may be provided with VIR information describing VIRs resulting from virtualization of IRs 111 by NIVS 130, VNR information describing VNRs resulting from virtualization of NRs 112 by NIVS 130, VSR information describing VSRs resulting from virtualization of SRs 113 by NIVS 130, or the like, as well as various combinations thereof. The network elements of CN 110 may maintain various types of information related to management and use of the VIRs produced as a result of virtualization of the IRs 111 of CN 110. The network elements of CN 110 may receive such information from NIVS 130, SSs 120, systems of entities managing and using VIRs produced as a result of virtualization of the IRs 111 of CN 110, or the like, as well as various combinations thereof. As discussed further below, this may involve various communication exchanges between network elements of CN 110 and various other elements of system 100.

It will be appreciated that network infrastructure virtualization may be provided for all or part of CN 110. It will be appreciated that, where network infrastructure virtualization is provided for one or more portions of CN 110, the one or more portions may be defined in various ways (e.g., geographically, based on network element type, based on network elements, based on service type, based on services, based on the communication layer(s) (e.g., portions of CN 110 for which infrastructure virtualization is provided may include portions of CN 110 operating at various communication layers (e.g., one or more of physical layer resources, link layer resources, network layer resources, transport layer resources, or the like, as well as various combinations thereof)), or the like, as well as various combinations thereof).

The SSs 120 include systems configured to provide various support functions for CN 110. For example, the SSs 120 may include operations support systems (OSSs), business support systems (BSSs), or the like, as well as various combinations thereof. For example, the SSs 120 may include network planning systems, network provisioning systems, service provisioning systems, element management systems, network management systems, network monitoring systems, service monitoring systems, network fault management systems, service failure management systems, or the like, as well as various combinations thereof.

The SSs 120 maintain various types of information related to CN 110, including various types of information describing NRs 112 of CN 110 (e.g., equipment identifiers of nodes, port identifiers of ports, interface identifiers, wavelength identifiers of wavelengths, communication link identifiers of communication links, network topology information describing interconnection of communication elements such as nodes and links, or the like, as well as various combinations thereof), various types of information describing SRs 113 of CN 110 (e.g., service identifiers of services, service endpoint identifiers of services, service characteristics information describing characteristics of services, or the like, as well as various combinations thereof), or the like, as well as various combinations thereof.

The SSs 120 may maintain various types of information produced as a result of virtualization of the IRs 111 of CN 110. For example, the SSs 120 may be provided with VIR information describing VIRs resulting from virtualization of IRs 111 by NIVS 130, VNR information describing VNRs resulting from virtualization of NRs 112 by NIVS 130, VSR information describing VSRs resulting from virtualization of SRs 113 by NIVS 130, or the like, as well as various combinations thereof. The SSs 120 may maintain various types of information related to management and use of the VIRs produced as a result of virtualization of the IRs 111 of CN 110. The SSs 120 may receive such information from NIVS 130, systems of entities managing and using VIRs produced as a result of virtualization of the IRs 111 of CN 110, network elements of CN 110 (e.g., NRs 112, from network elements hosting NRs 112, from SRs 113, from network elements hosting SRs 113, from NRs 112 supporting SRs 113, or the like), or the like, as well as various combinations thereof. As discussed further below, this may involve various communication exchanges between SSs 120 and various other elements of system 100.

The NIVS 130 is configured to provide network infrastructure virtualization functions for CN 110.

The NIVS 130 may be configured to provide network infrastructure virtualization functions for CN 110 by virtualizing the NI of CN 110 to provide a VNI for CN 110 (e.g., for multiple owners, as discussed further below) and using the VNI for CN 110 to support communications (e.g., by various tenants, as discussed further below). An exemplary method for providing and using a VNI for a communication network is depicted and described with respect to FIG. 2.

The NIVS 130 may be configured to provide network infrastructure virtualization functions for CN 110 in order to virtualize the NI of CN 110 to provide a VNI for CN 110. The NIVS 130 may be configured to virtualize the NI of CN 110 to provide the VNI for CN 110 by virtualizing the IRs 111 of CN 110 to provide virtualized IRs (VIRs) 131.

The NIVS 130 may be configured to virtualize the NI of CN 110 to provide the VNI for CN 110 by virtualizing the NRs 112 to provide virtualized NRs (VNRs) 132. The VNRs 132 may include virtual ports (v-ports), virtual ROADMs (v-ROADMs), virtual ILAs (v-ILAs), virtual wavelengths (v-λs), or the like, as well as various combinations thereof.

The NIVS 130 may be configured to virtualize the NI of CN 110 to provide the VNI for CN 110 by virtualizing the SRs 113 to provide virtualized SRs (VSRs 133). The VSRs 133 may include Ethernet virtual connections (EVCs), wavelength virtual connections (WVCs), virtual Ethernet services (e.g., virtualized point-to-point Ethernet services, virtualized point-to-multipoint Ethernet services, or the like), or the like.

The NIVS 130 may be configured to virtualize the NI of CN 110 to provide the VNI for CN 110 by obtaining IR information for the IRs 111 and processing the IR information for the IRs 111 to provide virtualized IR information describing the VIRs 131 to provide thereby the VNI for CN 110. The NIVS 130 may be configured to process the IR information for the IRs 111 to provide the virtualized IR information describing the VIRs 131 of the VNI based on a set of infrastructure virtualization data structures 135. The infrastructure virtualization data structures 135 enable the IRs 111 to be managed as VIRs 131, respectively, thereby providing virtualization of the NI of CN 110 to provide the VNI for CN 110. The infrastructure virtualization data structures 135 may be configured to enable or support various types of virtualization which may be provided by NIVS 130 for the IRs 111 using VIRs 131 (e.g., resource management based virtualization, resource ownership based virtualization, resource allocation based virtualization, resource administration based virtualization, or the like, as well as various combinations thereof). The infrastructure virtualization data structures 135 may provide a hierarchical object model that can enable allocation, pooling, sharing, nesting, chaining, and dedicating of various resources (e.g., VNRs 132 and VSRs 133) in various types of ecosystems (e.g., mobile ecosystems, emerging cloud ecosystems, or the like, as well as various combinations thereof). It is noted that an exemplary method for virtualizing the network infrastructure of a communication network to provide a virtualized network infrastructure for the communication network is depicted and described with respect to FIG. 4. It is noted that exemplary infrastructure virtualization data structures for use in virtualizing IRs 111 to provide VIRs 131 are depicted and described with respect to FIGS. 6A and 6B and FIGS. 7A and 7B.

The NIVS 130 may be configured to virtualize the NI of CN 110 to provide the VNI for CN 110 by obtaining NR information for the NRs 112 and processing the NR information for the NRs 112 to provide virtualized NR information describing the VNRs 132. The NIVS 130 may be configured to obtain NR information for the NRs 112 from elements of CN 110 (e.g., from the network elements themselves), from one or more of the SSs 120 (e.g., from one or more OSSs), or the like, as well as various combinations thereof. The NIVS 130 may be configured to process the NR information for the NRs 112 to provide the virtualized NR information describing the VNRs 132 based on a set of NR data structures 136 and a corresponding set of VNR data structures 137. The NIVS 130 may be configured to organize the NR information for the NRs 112 using the NR data structures 136 (e.g., by populating NR data structures 136 for the NRs 112 using the NR information for the NRs 112 that is obtained by the NIVS 130). The NIVS 130 may have access to one or more templates for the NR data structures 136 (e.g., a single template for use with all NRs 112, different templates for use with different types of NRs 112, or the like, as well as various combinations thereof). The NIVS 130 may be configured to process the NR information for the NRs 112 to provide the virtualized NR information describing the VNRs 132 by populating the VNR data structures 137 based on the NR data structures 136 (e.g., the VNR data structures 137 are configured to maintain the VNR information for the VNRs 132 that is determined by the NIVS 130 based on processing of the NR information for the NRs 112 that is maintained in the NR data structures 136). The NIVS 130 may be configured to populate the VNR data structures 137 based on the NR data structures 136 by extracting portions of the NR information for the NRs 112 from the NR data structures 136 and storing the extracted portions of the NR information within the VNR data structures 137 to provide VNR information for the VNRs 132 which correspond to the NRs 112. The NIVS 130 may have access to one or more templates for the VNR data structures 137 (e.g., a single template for use with all VNRs 132, different templates for use with different types of VNRs 132, or the like, as well as various combinations thereof). The VNR data structures 137 enable the NRs 112 to be managed as respective VNRs 132. It is noted that exemplary NR and VNR data structures for use in virtualizing NRs 112 to provide VNRs 132 are depicted and described with respect to FIGS. 6A and 6B.

The NIVS 130 may be configured to virtualize the NI of CN 110 to provide the VNI for CN 110 by obtaining SR information for the SRs 113 and processing the SR information for the SRs 113 to provide virtualized SR information describing the VSRs 133. The NIVS 130 may be configured to obtain SR information for the SRs 113 from elements of CN 110 (e.g., from the network elements themselves), from one or more of the SSs 120 (e.g., from one or more BSSs), or the like, as well as various combinations thereof. The NIVS 130 may be configured to process the SR information for the SRs 113 to provide the virtualized SR information describing the VSRs 133 based on a set of SR data structures 138 and a corresponding set of VSR data structures 139. The NIVS 130 may be configured to organize the SR information for the SRs 113 using the SR data structures 138 (e.g., by populating SR data structures 138 for the SRs 113 using the SR information for the SRs 113 that is obtained by the NIVS 130). The NIVS 130 may have access to one or more templates for the SR data structures 138 (e.g., a single template for use with all SRs 113, different templates for use with different types of SRs 113, or the like, as well as various combinations thereof). The NIVS 130 may be configured to process the SR information for the SRs 113 to provide the virtualized SR information describing the VSRs 133 by populating the VSR data structures 139 based on the SR data structures 138 (e.g., the VSR data structures 139 are configured to maintain the VSR information for the VSRs 133 that is determined by the NIVS 130 based on processing of the SR information for the SRs 113 that is maintained in the SR data structures 138). The NIVS 130 may be configured to populate the VSR data structures 139 based on the SR data structures 138 by extracting portions of the SR information for the SRs 113 from the SR data structures 138 and storing the extracted portions of the SR information within the VSR data structures 139 to provide VSR information for the VSRs 133 which correspond to the SRs 113. The NIVS 130 may have access to one or more templates for the VSR data structures 139 (e.g., a single template for use with all VSRs 133, different templates for use with different types of VSRs 133, or the like, as well as various combinations thereof). The VSR data structures 139 enable the SRs 113 to be managed as respective VSRs 133. It is noted that exemplary SR and VSR data structures for use in virtualizing SRs 113 to provide VSRs 133 are depicted and described with respect to FIGS. 7A and 7B.

The NIVS 130, as discussed above, is configured to virtualize the IRs 111 to provide the VIRs 131. The virtualization of the IRs 111 to provide the VIRs 131 may be used to provide various types of virtualization, such as resource management based virtualization, resource ownership based virtualization, resource allocation based virtualization, resource administration based virtualization, or the like, as well as various combinations thereof. The virtualization of the IRs 111 to provide the VIRs 131 may be used to support multi-owner virtualization such that multiple owners may share portions of the NI of the CN 110 (e.g., VIRs 131 may be used to provide different owners ownership of respective sets of VIRs 131 which share portions of the NI of the CN 110). The virtualization of the IRs 111 to provide the VIRs 131 may be used to support multi-tenant virtualization such that multiple tenants, at multiple hierarchical levels, may share portions of the NI of the CN 110 (e.g., VIRs 131 may be used to allocated respective sets of IRs 111 to tenants, where the allocations of VIs 131 may overlap across hierarchal levels, such that various tenants may share various portions of the NI of the CN 110). The virtualization of IRs 111 to VIRs 131 may be used to provide virtualization for various types of entities which may operate as owners and tenants of VIRs 131 and, thus, the underlying IRs 111 upon which the VIRs 131 are based.

The NIVS 130 may be configured to provide various other functions for use in virtualizing the IRs 111 to provide the VIRs 131.

The NIVS 130 may be configured to provide network infrastructure virtualization functions for CN 110 in order to use the VNI for CN 110. The NIVS 130 may be configured to control allocation of VIRs 131 to owners. The NIVS 130 may be configured to control administration of VIRs 131 by owners (e.g., using various applications, tools, or the like). The NIVS 130 may be configured to control allocation of VIRs 131 by owners to tenants, to control allocation of VIRs 131 by tenants to other tenants, or the like, as well as various combinations thereof. The NIVS 130 may be configured to control administration of VIRs 131 by tenants (e.g., using various applications, tools, or the like). The NIVS 130 may be configured to provide various other functions for supporting use of the VNI for CN 110 by owners and tenants. Various capabilities which may be supported by the NIVS 130 to support use the VNI for CN 110 by owners and tenants may be further understood by way of reference to FIGS. 2-12.

The NIVS 130, as discussed above, is configured to provide various network infrastructure virtualization functions for virtualizing the NI of CN 110 to provide the VNI for CN 110 and for using the VNI for CN 110 to support communications by various entities (e.g., owners and tenants).

The owners and tenants may be organized hierarchically, with each owner being able to allocate portions of the VNI of CN 110 (e.g., in the form of VIRs 131) to tenants at one or more of the hierarchical levels of tenants (e.g., the owners may allocate to certain types of tenants, which may in turn allocate to other types of tenants, and so forth).

The owners and tenants may fall into multiple categories of entities which may be involved in various aspects of providing communication networks and associated services and utilizing communication networks and associated services. For example, such entities may include communications service providers (CPSs), which may primarily include network operators that own central offices, data centers, and the interconnecting networks. CSPs may include local providers (incumbent cable and alternate operators, long haul providers, mobile network operators, or the like). For example, such entities may include carrier-neutral providers (CNPs), which may include data center operators (e.g., with multi-site, terabit-scale requirements primarily focused on providing co-location, power, rack-space, servers, storage, and interconnections to various types of entities such as CSPs, Internet cloud providers, Internet content providers, Information Technology (IT) service providers, Enterprises, or the like). The entities may include Internet content-cloud providers (ICPs), which may include webscale Internet companies, technical large enterprises, and global Systems Integrators (SIs) providing content, cloud services, social media services, IT services, or the like, as well as various combinations thereof. ICPs may include ICPs for consumers (e.g., for which the primary focus is on consumer markets), ICPs for enterprises (e.g., for which the primary focus is on delivering IT solutions to enterprises and small and medium businesses which do not have an IT department). For example, such entities may include TI/SI providers, for which the primary focus may be on providing IT/SI solutions for large enterprises (e.g., IT providers providing IT solutions for DCs (e.g., servers, storage, virtualization, or the like), SI/IT providers providing private cloud solutions, or the like, as well as various combinations thereof). For example, such entities may include enterprises (e.g., banks, finance and stock exchanges, healthcare companies, manufacturing companies, media companies, oil and gas companies, transportation companies, utility companies, or the like), governments, public sector agencies, research organizations, education institutions, or the like, as well various combinations thereof.

The multiple owners may include one or more of local CPSs, long-haul CSPs, CNPs, enterprise ICPs, or the like, as well as various combinations thereof. The owners may own respective VIRs 131 such that the owners share portions of the NI of CN 110 (which typically would be owned by a single owner that would be responsible for all of the ownership functions).

The multiple tenants may include one or more types of tenants at one or more hierarchical levels. The hierarchical levels may include various numbers of hierarchical levels which may be defined in various ways, organized with respect to each other in various ways, or the like, as well as various combinations thereof. For example, the hierarchical levels of the tenants may include Business Units, Partners, Customers, and End Users (although it will be appreciated that fewer or more hierarchical levels may be provided, one or more of the hierarchical levels may be defined in different ways, or the like, as well as various combinations thereof). The hierarchical levels may be internally organized in various ways (e.g., one or more of the hierarchical levels may include multiple tenant types, one or more of the hierarchical levels may organize multiple tenant types hierarchically, or the like, as well as various combinations thereof). For example, the Business Units level may include Infrastructure Business Units, Wholesale Business Units, Retail Business Units, or the like, as well as various combinations thereof. For example, the Partners level may include SI/IT Partners, Cloud Partners, Industrial IOT Partners, or the like, as well as various combinations thereof. For example, the Customers level may include Enterprise Customers, Mobile Customers, Cloud Customers, Industrial IOT Customers, or the like, as well as various combinations thereof. The multiple tenants may include one or more types of tenants which may operate at one or more of the hierarchical levels. For example, Business Unit tenant types may include consumer ICPs, mobile CSPs, SI/IT providers, or the like, as well as various combinations thereof. For example, Partner tenant types may include enterprise ICPs, consumer ICPs, SI/IT providers, enterprises, governments, or the like, as well as various combinations thereof.

The NIVS 130, as depicted in FIG. 1, maintains various types of information produced as a result of virtualization of the IRs 111 of CN 110. For example, NIVS 130 maintains VIRs 131 including VNRs 132 and VSRs 133. The NIVS 130 may be configured to maintain such information in various ways (omitted from FIG. 1 for purposes of clarity), such as using one or more data storage devices, one or more databases, or the like, as well as various combinations thereof. The NIVS 130, as discussed above, may be configured to provide various types of information produced as a result of virtualization of the IRs 111 of CN 110 to various other elements of system 100 (e.g., SSs 120, IRs 111 of CN 110 (e.g., network elements or the like), or the like, as well as various combinations thereof). As discussed further below, this may involve various communication exchanges between NIVS 130 and various other elements of system 100.

The NIVS 130 may be configured to provide various other network infrastructure virtualization functions for virtualizing the NI of CN 110 to provide the VNI for CN 110 and for using the VNI for CN 110 to support communications by various entities.

As discussed herein, system 100 is configured to support network infrastructure virtualization in order to provide a virtualized infrastructure for a communication network and to support use of the virtualized infrastructure by various entities. This may include various types of communications between various devices to provide virtualized infrastructure for a communication network and to support use of the virtualized infrastructure by various entities.

For example, virtualization of the NI of CN 110 to provide the VNI for CN 110 may include messaging between NIVS 130 and various elements. The NIVS 130 may obtain infrastructure information describing the IRs 111 of the NI of the communication network 110 and processing the infrastructure information, based on a set of infrastructure virtualization data structures, to provide virtualized infrastructure information describing the VIRs 131 of the VNI of CN 110. The NIVS 130 may obtain the obtain infrastructure information describing the IRs 111 of the NI of the communication network 110 by sending messages to various elements of system 100 (e.g., network elements of CN 110, SSs 120, or the like, as well as various combinations thereof. The NIVS 130 may communicate the virtualized infrastructure information describing the VIRs 131 of the VNI of the CN 110 to various elements of system 100. For example, NIVS 130 may communicate the virtualized infrastructure information describing the VIRs 131 of the VNI of the CN 110 to various SSs 120 (e.g., to make the information available on the SSs 120 for use in performing various support system functions related to the VIRs 131, for use in controlling establishment of ownership of VIRs on network elements of CN 110 (e.g., to one or more provisioning systems, one or more management systems, or the like), to support allocation of VIRs on network elements of CN 110 (e.g., to one or more provisioning systems, to one or more resource allocation systems, or the like), to support management of VIRs allocated on network elements of CN 110 (e.g., to one or more provisioning systems, to one or more monitoring systems, to one or more fault detection systems, to one or more reconfiguration systems, or the like), to support administration of VIRs allocated on network elements of CN 110 (e.g., to one or more status tracking systems, to one or more monitoring systems, or the like), or the like, as well as various combinations thereof). For example, NIVS 130 may communicate the virtualized infrastructure information describing the VIRs 131 of the VNI of the CN 110 to various network elements of CN 110 (e.g., to make the information available on the network elements, to establish ownership of VIRs on the network elements, to allocate VIRs on the network elements, to manage VIRs allocated on the network elements, to support administration of VIRs on the network elements, or the like, as well as various combinations thereof). For example, NIVS 130 may communicate the virtualized infrastructure information describing the VIRs 131 of the VNI of the CN 110 to various other elements (e.g., systems, devices, or the like) which may form part of CN 110, be associated with CN 110, or the like, as well as various combinations thereof. It will be appreciated that such messaging may include various types of messages (e.g., queries, instructions, commands, or the like). It will be appreciated that such messaging may incorporate various aspects of network infrastructure virtualization as presented herein.

For example, ownership of VIRs 131 of the VNI of the CN 110 by multiple owners may include messaging between various elements. This may include assignment of ownership of VIRs 131, modification of ownership of VIRs 131, or the like, as well as various combinations thereof. This may include messaging between NIVS 130 and SSs 120 of the owners which own the VIRs 131 (e.g., from NIVS 130 to SSs 120 to inform the SSs 120 of ownership of VIRs 131 by respective owners, from SSs 120 to NIVS 130 to request ownership of VIRs 131, from SSs 120 to NIVS 130 to request ownership information for one or more VIRs 131, or the like, as well as various combinations thereof). This may include messaging between NIVS 130 and network elements of CN 110 (e.g., from NIVS 130 to network elements to inform the network elements of ownership of VIRs 131 by respective owners, from network elements to NIVS 130 to request ownership information for one or more VIRs 131, or the like, as well as various combinations thereof). This may include messaging between SS 120 and network elements of CN 110 (e.g., from SSs 120 to network elements to inform the network elements of ownership of VIRs 131 by respective owners, from network elements to SSs 120 to request ownership information for one or more VIRs 131, or the like, as well as various combinations thereof). It will be appreciated that such messaging may include various types of messages (e.g., queries, instructions, commands, or the like). It will be appreciated that such messaging may incorporate various aspects of network infrastructure virtualization as presented herein.

For example, allocation of VIRs 131 of the VNI of the CN 110 to various tenants may include messaging between various elements. This may include initial allocation of VIRs 131, modification of allocation of VIRs 131, or the like, as well as various combinations thereof. The allocation of VIRs 131 may be performed at various hierarchical levels (e.g., from owners to tenants, between tenants, or the like). This may include messaging between NIVS 130 and SSs 120 of owners of the VIRs 131 (e.g., from NIVS 130 to SSs 120 of owners to inform the SSs 120 of VIRs 131 available for allocation to tenants, from SSs 120 of owners to NIVS 130 to inform the NIVS 130 of allocation of VIRs 131 to tenants, from NIVS 130 to SSs 120 of owners to request information regarding allocation of VIRs 131 to tenants, or the like). This may include messaging between NIVS 130 and SSs 120 of tenants to which the VIRs 131 are allocated (e.g., from NIVS 130 to SSs 120 of tenants to inform the SSs 120 that allocation of VIRs 131 to the tenants is complete such that the VIRs 131 are available for use by the tenants, from SSs 120 of tenants to NIVS 130 to inform the NIVS 130 of allocation of VIRs 131 to tenants, from NIVS 130 to SSs 120 of tenants to request information regarding allocation of VIRs 131 to tenants, or the like). This may include messaging between NIVS 130 and network elements of CN 110 (e.g., from NIVS 130 to network elements to configure the network elements to support the allocations of VIRs 131 to the tenants, from the network elements to the NIVS 130 to provide information regarding configuration of the network elements to support the allocations of VIRs to the tenants, or the like). This may include messaging between SSs 120 (e.g., SSs 120 of owners, SSs 120 of tenants, or the like) and network elements of CN 110 (e.g., from SSs 120 to network elements to configure the network elements to support the allocations of VIRs 131 to the tenants, from the network elements to the SSs 120 to provide information regarding configuration of the network elements to support the allocations of VIRs to the tenants, or the like). It will be appreciated that such messaging may include various types of messages (e.g., queries, instructions, commands, or the like). It will be appreciated that such messaging may incorporate various aspects of allocation of virtualized infrastructure resources as presented herein.

For example, administration of VIRs 131 of the VNI of the CN 110 by various entities (e.g., owners, tenants, or the like) may include messaging between various elements. This may include various types of administration which may be performed. The administration of VIRs 131 may be performed at various hierarchical levels. This may include messaging between NIVS 130 and SSs 120 of owners of the VIRs 131 (e.g., from NIVS 130 to SSs 120 of owners to perform administration of VIRs 131 allocation to tenants, from SSs 120 of owners to NIVS 130 to inform the NIVS 130 regarding administration of VIRs 131 allocated to tenants, from NIVS 130 to SSs 120 of owners to request information regarding administration of VIRs 131 allocated to tenants, or the like). This may include messaging between NIVS 130 and SSs 120 of tenants to which the VIRs 131 are allocated (e.g., from NIVS 130 to SSs 120 of tenants to for administration of VIRs 131 allocated to the tenants, from SSs 120 of tenants to NIVS 130 to inform the NIVS 130 regarding administration of VIRs 131 allocated to tenants, from NIVS 130 to SSs 120 of tenants to request information regarding administration of VIRs 131 allocated to tenants, or the like). This may include messaging between NIVS 130 and network elements of CN 110 (e.g., from NIVS 130 to network elements to perform administration of VIRs 131 hosted on the network elements, from the network elements to the NIVS 130 to provide information regarding administration of VIRs 131 hosted on the network elements, or the like). This may include messaging between SSs 120 (e.g., SSs 120 of owners, SSs 120 of tenants, or the like) and network elements of CN 110. (e.g., from SSs 120 to network elements to perform administration of VIRs 131 hosted on the network elements, from the network elements to the SSs 120 to provide information regarding administration of VIRs 131 hosted on the network elements, or the like). It will be appreciated that such messaging may include various types of messages (e.g., queries, instructions, commands, or the like). It will be appreciated that such messaging may incorporate various aspects of administration of virtualized infrastructure resources as presented herein.

It will be appreciated that various other types of messaging may be supported within system 100 to support network infrastructure virtualization in order to provide a virtualized infrastructure for a communication network.

It will be appreciated that, although primarily presented in FIG. 1 with respect to specific arrangements of elements and functions of the network infrastructure virtualization mechanism, various elements and functions of the network infrastructure virtualization mechanism may be arranged in various other ways.

Figure 2:
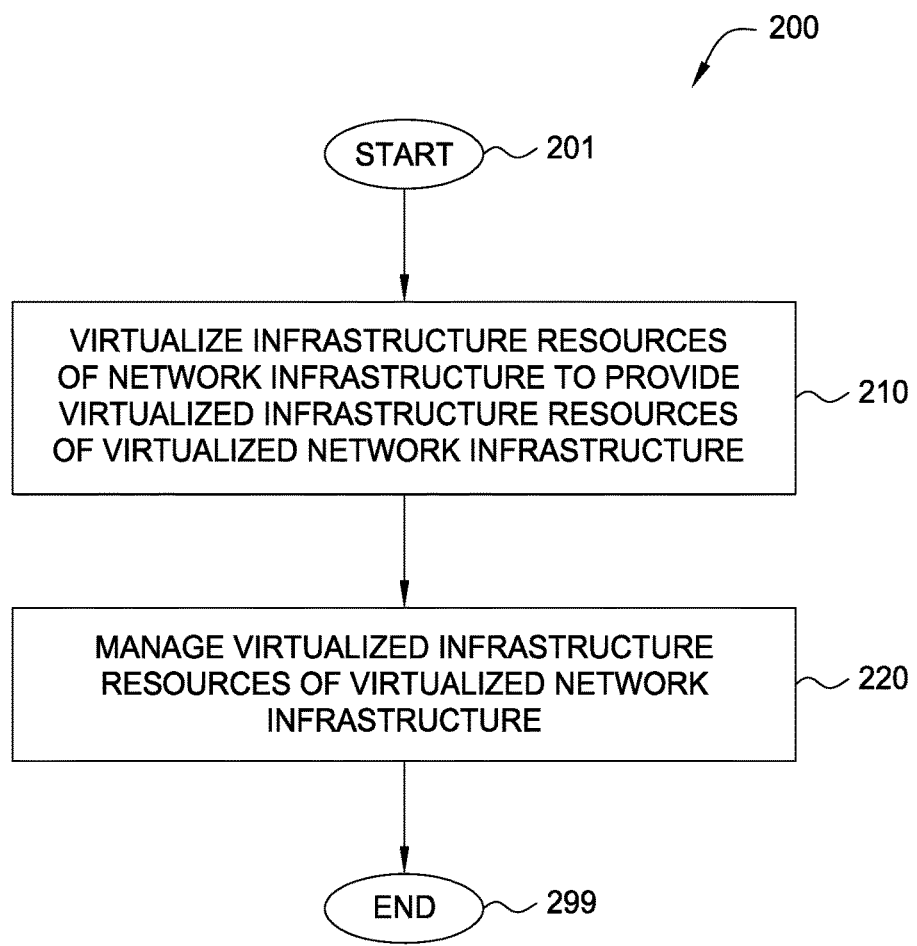
FIG. 2 depicts an embodiment of a method for using network infrastructure virtualization to provide and use a virtualized infrastructure for a communication network.

FIG. 2 depicts an embodiment of a method for using network infrastructure virtualization to provide and use a virtualized infrastructure for a communication network. It will be appreciated that, although depicted and described as being performed serially, at least a portion of the functions of method 200 may be performed contemporaneously or in a different order than as presented in FIG. 2.

At block 201, method 200 begins.

At block 210, IRs of an NI of a communication network are virtualized to provide VIRs of a VNI for the communication network. The virtualization of the IRs of an NI of a communication network to provide VIRs of a VNI for the communication network may include receiving infrastructure information describing the IRs of the NI of the communication network and processing the infrastructure information, based on a set of infrastructure virtualization data structures, to provide virtualized infrastructure information describing the VIRs of the VNI of the communication network. An exemplary embodiment of a method for virtualizing IRs of an NI to provide VIRs of a VI is depicted and described with respect to FIG. 4.

At block 220, the VIRs of the VNR are managed to support use of the VIRs by various entities. The management of VIRs may include allocation of VIRs to various entities, administration of VIRs by various entities, or the like, as well as various combinations thereof. The management of VIRs may include communication with one or more of the IRs based on the virtualized infrastructure information describing the VIRs of the VNI of the communication network. For example, the communication may include one or more of queries for information, a configuration command for configuring an infrastructure resource to support a virtualized infrastructure resource, a configuration command for configuring a network resource to support a virtualized network resource, a configuration command for configuring a service resource to support a virtualized service resource, or the like, as well as various combinations thereof.

At block 299, method 200 ends.

Figure 3:
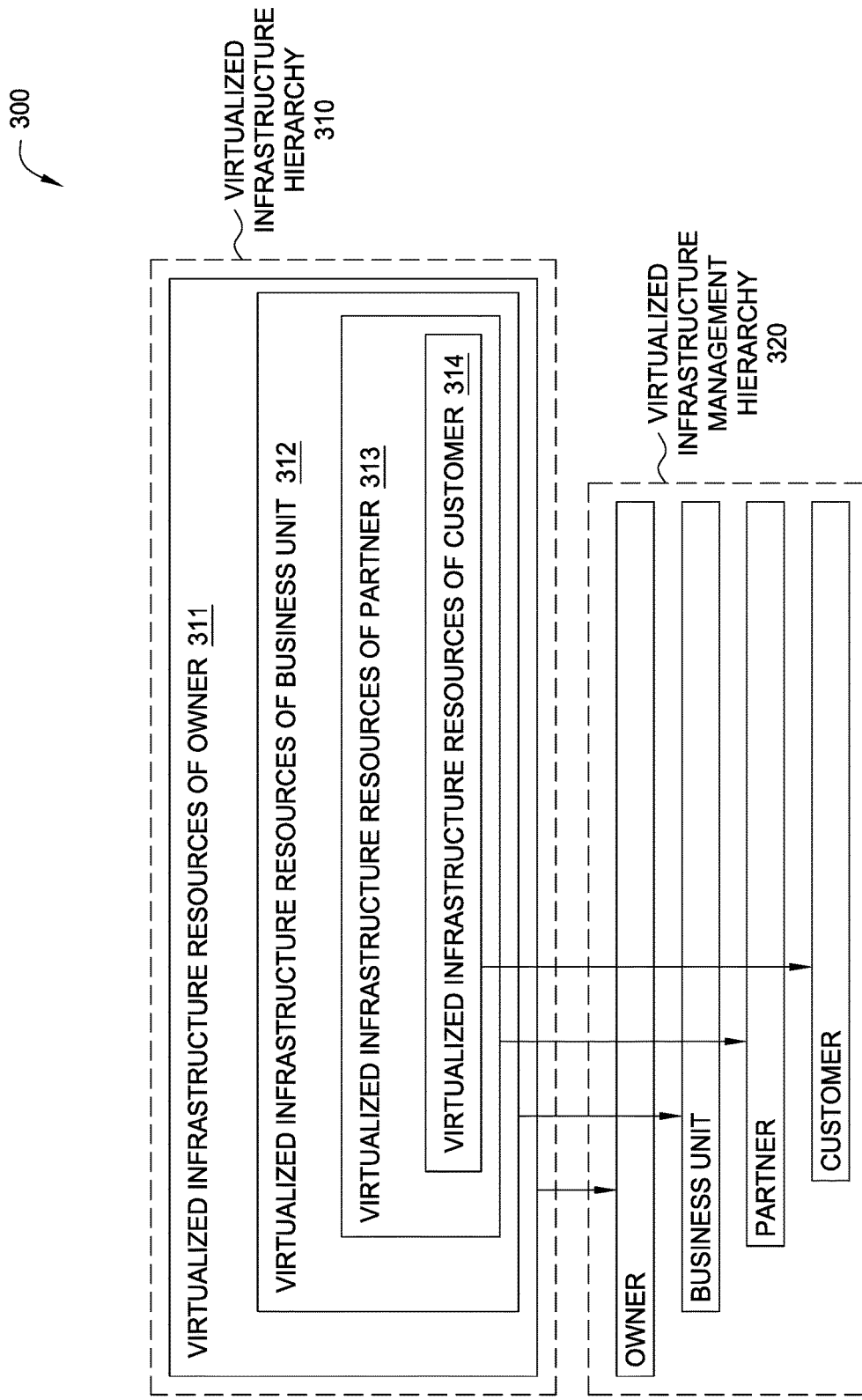
FIG. 3 depicts an exemplary resource virtualization and management hierarchy associated with the infrastructure virtualization method of FIG. 2.

FIG. 3 depicts an exemplary resource virtualization and management hierarchy associated with the infrastructure virtualization method of FIG. 2.

As depicted in FIG. 3, the resource virtualization and management hierarchy 300 of FIG. 3 generally corresponds to the blocks of method 200 of FIG. 2.

For example, virtualized infrastructure hierarchy 310 of FIG. 3 corresponds to the infrastructure resource virtualization performed in block 210 of FIG. 2 (e.g., virtualized infrastructure hierarchy 310 may be an output of block 210 of FIG. 2). As depicted in FIG. 3, virtualized infrastructure hierarchy 310 illustrates that virtualized infrastructure resources of a network may be owned by an owner as virtualized infrastructure resources of an owner 311, virtualized infrastructure resources of an owner 311 may be allocated to a business unit as virtualized infrastructure resources of a business unit 312, virtualized infrastructure resources of a business unit 312 may be allocated to a partner as virtualized infrastructure resources of a partner 313, and virtualized infrastructure resources of a partner 313 may be allocated to a customer as virtualized infrastructure resources of a customer 314.

For example, virtualized infrastructure management hierarchy 320 of FIG. 3 corresponds to the virtualized infrastructure resource management performed in block 220 of FIG. 2 (e.g., virtualized infrastructure management hierarchy 320 may be supported by block 220 of FIG. 2). As depicted in FIG. 3, virtualized infrastructure management hierarchy 320 illustrates that virtualized infrastructure resources of an owner 311 may be managed by the owner, virtualized infrastructure resources of a business unit 312 may be managed by the business unit, virtualized infrastructure resources of a partner 313 may be managed by the partner, and virtualized infrastructure resources of a customer 314 may be managed by the customer.

Figure 4:
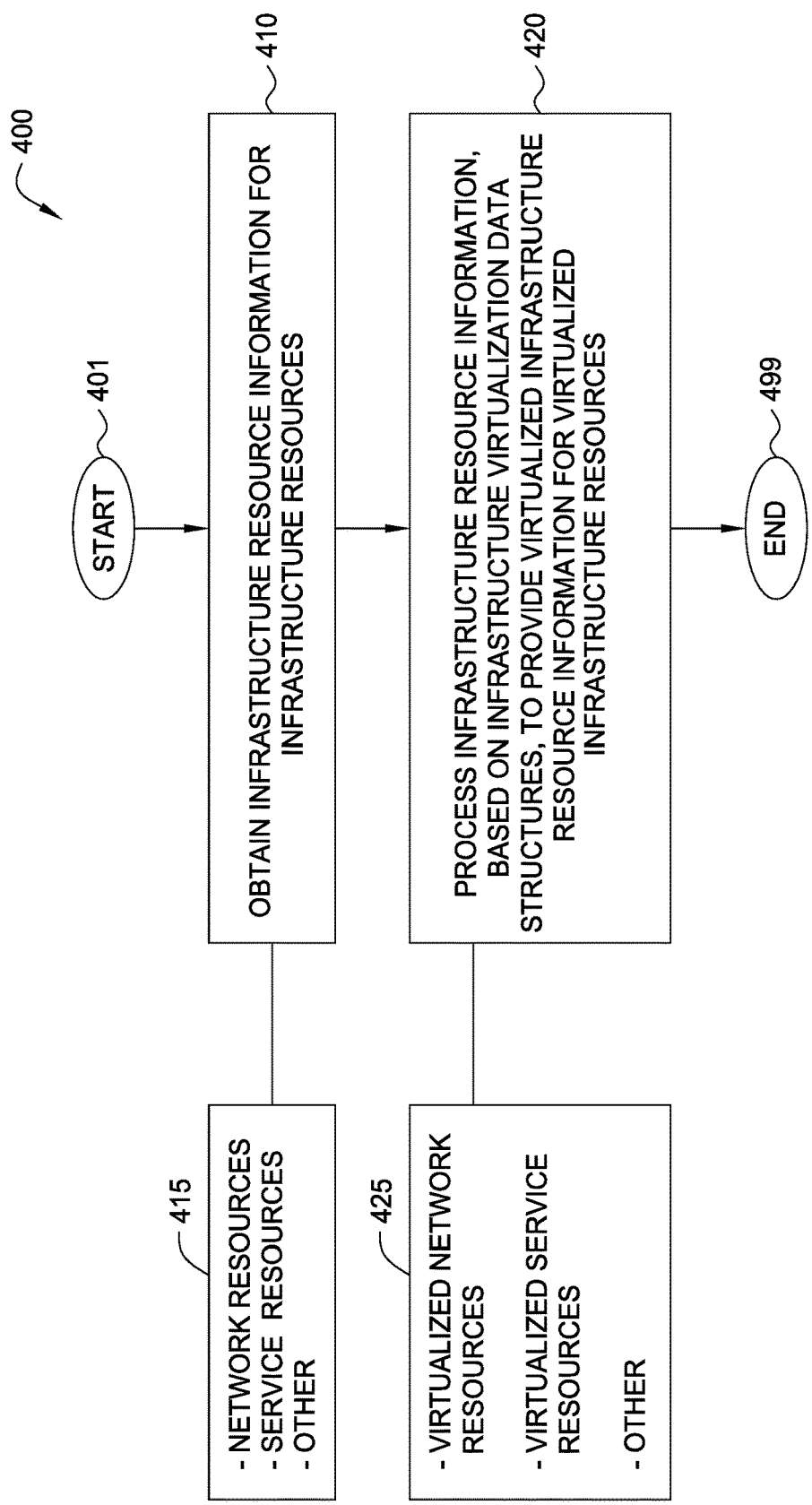
FIG. 4 depicts an exemplary method for using infrastructure virtualization to provide a virtualized infrastructure for a communication network.

FIG. 4 depicts an exemplary method for using infrastructure virtualization to provide a virtualized infrastructure for a communication network. It will be appreciated that, although depicted and described as being performed serially, at least a portion of the functions of method 400 may be performed contemporaneously or in a different order than as presented in FIG. 4.

At block 401, method 400 begins.

At block 410, IR information for IRs is obtained. As indicated by block 415, the IRs may include NRs, SRs, or the like.

At block 420, the IR information is processed, based on infrastructure virtualization data structures, to provide VIR information for VIRs. In general, for IRs, the infrastructure virtualization data structures may include IR data structures and VIR data structures, and the processing of the IR information of the IRs to provide VIR information for corresponding VIRs may include (1) populating IR data structures with the IR information for the IRs and then (2) populating VIR data structures, based on the IR information for the IRs in the IR data structures, to provide the corresponding VIRs. The population of IR data structures with the IR information for the IRs may include identification of the IR data structures to be used for the respective IRs (e.g., based on one or more of resource type, virtualization type, or the like, as well as various combinations thereof). The population of VIR data structures with the VIR information for the IRs may include identification of the VIR data structures to be used for the respective VIRs (e.g., based on one or more of resource type, virtualization type, or the like, as well as various combinations thereof). As indicated by block 425, the processing of IR information for IRs to provide VIR information for VIRs may be performed for NRs, SRs, or the like, as well as various combinations thereof.

For NRs, for example, the infrastructure virtualization data structures may include NR data structures and VNR data structures, and the processing of the NR information of the NRs to provide VNR information for corresponding VNRs may include (1) populating NR data structures with the NR information for the NRs and then (2) populating VNR data structures, based on the NR information for the NRs in the NR data structures, to provide the corresponding VNRs. As discussed herein, exemplary NR and VNR data structures for use in virtualizing NRs to provide VNRs are depicted and described with respect to FIGS. 6A and 6B.

For SRs, for example, the infrastructure virtualization data structures may include SR data structures and VSR data structures, and the processing of the SR information of the SRs to provide VSR information for corresponding VSRs may include (1) populating SR data structures with the SR information for the SRs and then (2) populating VSR data structures, based on the SR information for the SRs in the SR data structures, to provide the corresponding VSRs. As discussed herein, exemplary SR and VSR data structures for use in virtualizing SRs to provide VSRs are depicted and described with respect to FIGS. 7A and 7B.

At block 499, method 400 ends.

Figure 5:
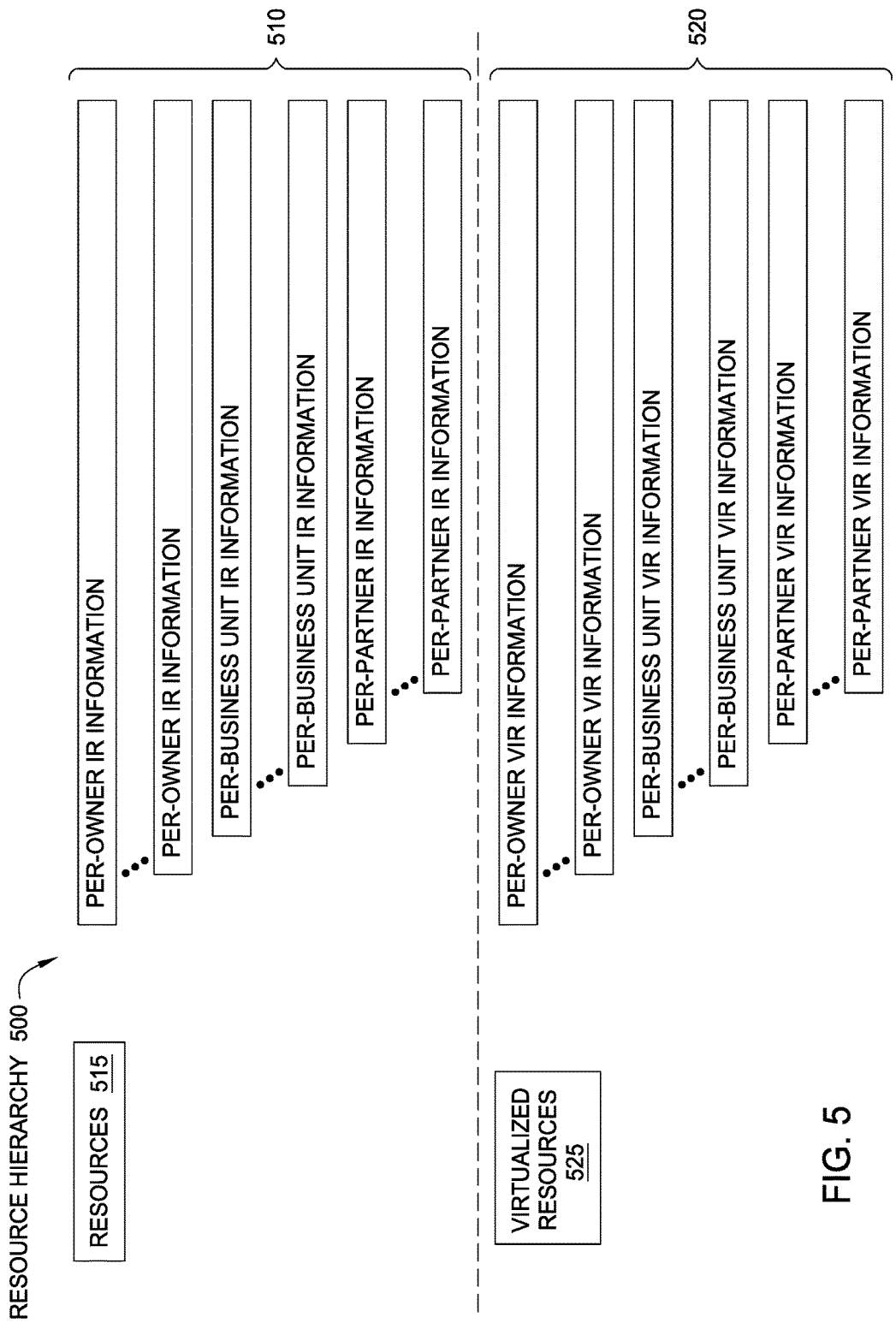
FIG. 5 depicts an exemplary resource hierarchy associated with the infrastructure virtualization method of FIG. 4.

FIG. 5 depicts an exemplary resource hierarchy associated with the infrastructure virtualization method of FIG. 4.

As depicted in FIG. 5, the resource hierarchy 500 of FIG. 5 generally corresponds to the blocks of method 400 of FIG. 4.

For example, resources 515 of FIG. 5 correspond to the infrastructure resource information of block 415 of FIG. 4 (e.g., network resources, service resources, or the like) and the hierarchical arrangement of such infrastructure resource information is illustrated in FIG. 5 (e.g., one or more sets of per-owner IR information, one or more sets of per business unit IR information, one or more sets of per partner IR information, or the like, which are grouped together as hierarchical information 510).

For example, virtualized resources 525 of FIG. 5 correspond to the virtualized infrastructure resource information of block 425 of FIG. 4 (e.g., virtualized network resources, virtualized service resources, or the like) and the hierarchical arrangement of such virtualized infrastructure resource information is illustrated in FIG. 5 (e.g., one or more sets of per-owner VIR information, one or more sets of per business unit VIR information, one or more sets of per partner VIR information, or the like, which are grouped together as hierarchical information 520).

Figure 6B:
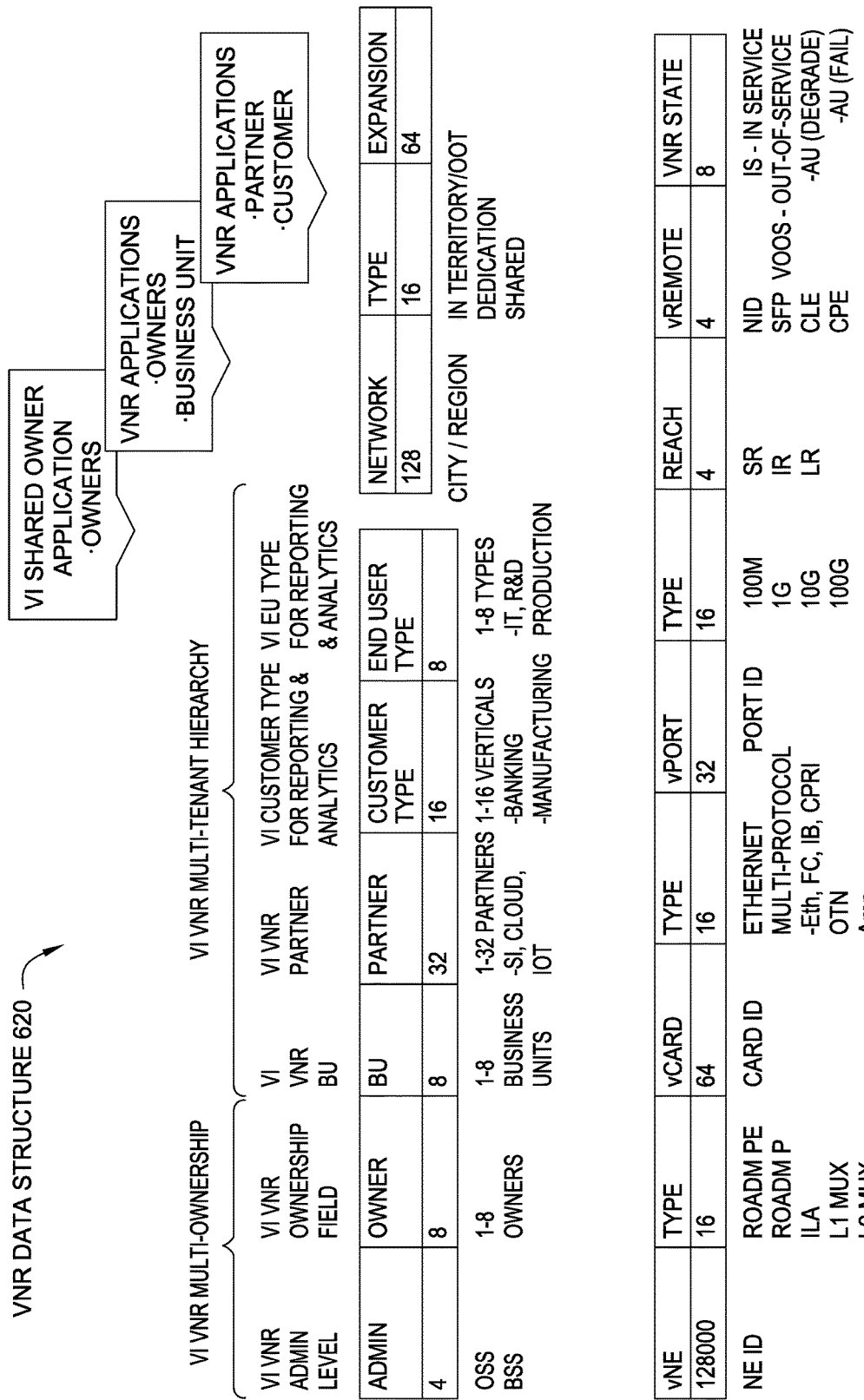

FIGS. 6A and 6B depict a network resource data structure and an associated virtualized network resource data structure.

As depicted in FIG. 6A, the NR data structure 610 includes a number of fields populated with corresponding NR information for the NR (as well as associated explanations and examples associated with at least some of the fields). The NR data structure 610 may be populated with a combination of OSS data and VI data. In this example, the NR is a port of a network element and the NR data structure 610 includes port information describing the port of the network element. Namely, the NR data structure 610 includes an NE field including a network element identifier of the network element with which the port is associated (illustratively, 128000), a TYPE field associated with the NE field that includes a network element type of the network element (illustratively, 16), a CARD field including a card identifier of the line card on which the port is disposed (illustratively, 64), a TYPE field associated with the CARD field that includes a card type of the line card (illustratively, 16), a PORT field including a port identifier of the port (illustratively, 32), a TYPE field associated with the PORT field that includes a port type of the port (illustratively, 16), a REACH field including an indication of the extent of reach of the port (illustratively, 4), a REMOTE field including an indication of the type of remote device with which the port communicates (illustratively, 4), an NR STATE field including an indication of the state of the port (illustratively, 4), a LOCATION field that includes a postal location of the network element (e.g., a postal address), a GPS field that indicates a GPS location of the network element (e.g., latitude and longitude information), a CONTACT information field that includes contact information for a person responsible for maintaining the network element, a NETWORK field including a network identifier of the network to which the network element belongs (illustratively, 128), a TYPE field associated with the NETWORK field that includes a network type of the network (illustratively, 16), an EXPANSION field that includes additional network attributes (e.g., packet, circuit, KPI metrics, which, illustratively, has a value of 64), a HISTORY field that includes historical information regarding the network element (e.g., a year in which it was deployed, a date on which it was last serviced, or the like), a FAULTS field for fault types (e.g., facility, fiber, power, network, card, service, port, or the like), and an EXPANSION field for additional failure attributes. It will be appreciated that the above-described fields of NR data structure 610 may be defined in different ways, include other types of information, or the like. It will be appreciated the NR data structure 610 may include fewer or more fields of information. It will be appreciated that NR data structure 610 is an exemplary data structure for a particular type of network resource (namely, a port) and that other data structures may be used for other types of network resources (e.g., including less or more, as well as different, information or the like).

As depicted in FIG. 6B, the VNR data structure 620 includes a number of fields populated with corresponding VNR information for the VNR (as well as associated explanations and examples associated with at least some of the fields). In this example, the VNR is a virtual port (v-port) representing virtualization of the port described by NR data structure 610 of FIG. 6A and, thus, that the VNR data structure 620 includes port information describing the v-port. As depicted in FIG. 6B, the VNR data structure 620 includes some of the fields from the NR data structure 610 of FIG. 6A, as well as additional fields, which operate to provide a v-port for the port described by NR data structure 610 of FIG. 6A. The VNR data structure 620 includes an ADMIN field that includes an indication as to a type of administration which may be used for the v-port (illustratively, 4), an OWNER field including an identifier of the owner of the v-port (illustratively, 8), a BU field including an identifier of the business unit to which the v-port has been allocated by the owner indicated in the OWNER field (illustratively, 8), a PARTNER field including an identifier of the Partner to which the v-port has been allocated by the business unit indicated in the BU field (illustratively, 32), a CUSTOMER TYPE field including an identifier of the customer to which the v-port has been allocated by the partner indicated in the PARTNER field (illustratively, 8), an END USER TYPE field including an indication of the type of end user to which the v-port has been allocated by the customer indicated in the CUSTOMER TYPE field, a NETWORK field including a network identifier of the network to which the network element belongs (illustratively, 128), a TYPE field associated with the NETWORK field that includes a network type of the network (illustratively, 16), an EXPANSION field that includes additional network attributes (packet, circuit, KPI metrics), a vNE field including a network element identifier of the virtual network element with which the v-port is associated (illustratively, 128000), a TYPE field associated with the vNE field that includes a network element type of the virtual network element (illustratively, 16), a vCARD field including a card identifier of the virtual line card on which the v-port is disposed (illustratively, 64), a TYPE field associated with the vCARD field that includes a card type of the virtual line card (illustratively, 16), a vPORT field including a port identifier of the v-port (illustratively, 32), a TYPE field associated with the vPORT field that includes a port type of the v-port (illustratively, 16), a REACH field including an indication of the extent of reach of the v-port (illustratively, 4), a vREMOTE field including an indication of the type of remote device with which the v-port communicates (illustratively, 4), and a VNR STATE field including an indication of the state of the v-port (e.g., In Service (IS), Out-of-Service (OOS), AU (degrade), AU (fail), or the like, which, illustratively, has a value of, illustratively, 8). It will be appreciated that the above-described fields of VNR data structure 620 may be defined in different ways, include other types of information, or the like. It will be appreciated the VNR data structure 620 may include fewer or more fields of information. It will be appreciated that VNR data structure 620 is an exemplary data structure for a particular type of virtualized network resource (namely, a v-port) and that other data structures may be used for other types of virtualized network resources (e.g., including less or more, as well as different, information or the like).

Figure 7B:
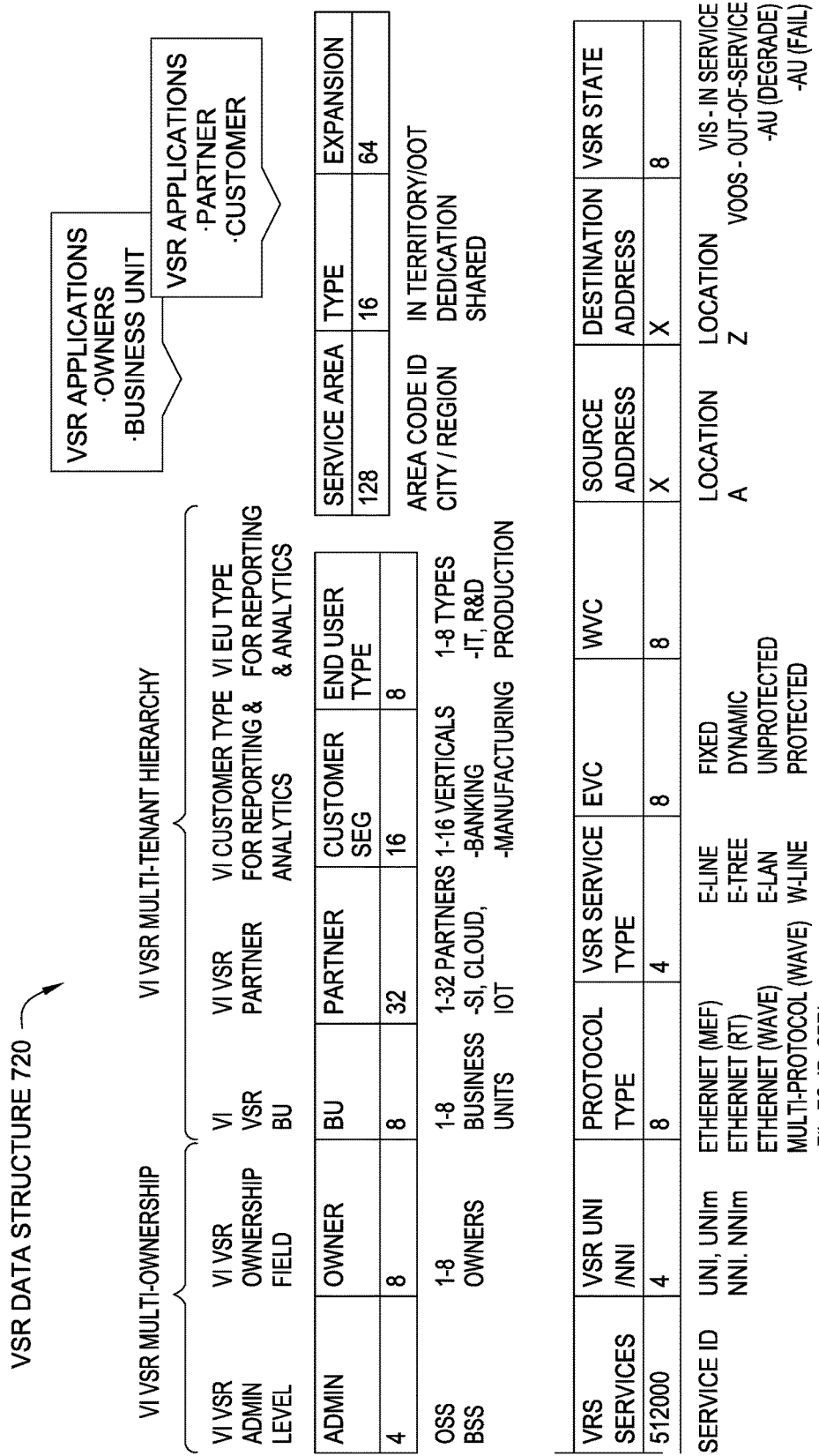

FIGS. 7A and 7B depict a service resource data structure and an associated virtualized service resource data structure.

As depicted in FIG. 7A, the SR data structure 710 includes a number of fields populated with corresponding SR information for the SR (as well as associated explanations and examples associated with at least some of the fields). The SR data structure 710 may be populated with a combination of BSS data and VI data. In this example, the SR is an Ethernet service and the SR data structure 710 includes Ethernet service information describing the Ethernet service. Namely, the SR data structure 710 includes a SERVICES field including a service identifier of the Ethernet service (illustratively, 512000), a UNI/NNI field including an indication of the type of interface of the Ethernet service (illustratively, 4), a PROTOCOL TYPE field including an indication of the protocol type of the Ethernet service (illustratively, 8), a SERVICE TYPE field including an indication of the service type of the Ethernet service (illustratively, 4), an EVC field including an identifier of the Ethernet Virtual Connection of the Ethernet service (illustratively, 8), a WVC field including an identifier of a wavelength virtual connection of the Ethernet service (illustratively, 8), a SOURCE ADDRESS field including a source address of the Ethernet service, a DESTINATION ADDRESS field including a destination address of the Ethernet service, an SR STATE field including an indication of the state of the Ethernet service (illustratively, 8), an SLA field including an identifier of a service level agreement to be supported for the Ethernet service (illustratively, 128), a RATE field including an indication of a data rate to be supported for the Ethernet service (illustratively, 128), a CIR field including an indication of a committed information rate to be supported for the Ethernet service (illustratively, 16), an EIR field including an indication of an excess information rate (burst rate) to be supported for the Ethernet service (illustratively, 16), a BILLING field including a postal address associated with the Ethernet service, a CUSTOMER ID field including a customer identifier of the customer of the Ethernet service (e.g., an account number or other suitable identifier), a CONTACT information field that includes contact information for a person responsible for the Ethernet service, a HISTORY field that includes historical information regarding the Ethernet service (e.g., a date on which the Ethernet service was first activated, a date on which the Ethernet service was last modified, or the like), a CHURN field (e.g., service date changes, administrative level, time intervals, or the like), an EXPANSION field that includes additional service attributes (availability, performance, latency, or the like), a SERVICE AREA field including an indication of a location in which the Ethernet service is provided (illustratively, 128), a TYPE field including an indication of a service area type of the service area indicated in the SERVICE AREA field (illustratively, 16), and an EXPANSION field that includes additional service attributes (availability, performance, latency, or the like). It will be appreciated that the above-described fields of SR data structure 710 may be defined in different ways, include other types of information, or the like. It will be appreciated the SR data structure 710 may include fewer or more fields of information. It will be appreciated that SR data structure 710 is an exemplary data structure for a particular type of service resource (namely, an Ethernet service) and that other data structures may be used for other types of service resources (e.g., including less or more, as well as different, information or the like).

As depicted in FIG. 7B, the VSR data structure 720 includes a number of fields populated with corresponding VSR information for the VSR (as well as associated explanations and examples associated with at least some of the fields). In this example, the VSR is a virtual Ethernet service representing virtualization of the Ethernet service described by SR data structure 710 of FIG. 7A and, thus, that the VSR data structure 720 includes Ethernet service information describing the virtual Ethernet service. As depicted in FIG. 7B, the VSR data structure 720 includes some of the fields from the SR data structure 710 of FIG. 7A, as well as additional fields, which operate to provide a virtual Ethernet service for the Ethernet service described by SR data structure 710 of FIG. 7A. The VSR data structure 720 includes an ADMIN field that includes an indication as to a type of administration which may be used for the virtual Ethernet service (illustratively, 4), an OWNER field including an identifier of the owner of the virtual Ethernet service (illustratively, 8), a BU field including an identifier of the business unit to which the virtual Ethernet service has been allocated by the owner indicated in the OWNER field (illustratively, 8), a PARTNER field including an identifier of the Partner to which the virtual Ethernet service has been allocated by the business unit indicated in the BU field (illustratively, 32), a CUSTOMER TYPE field including an identifier of the customer to which the virtual Ethernet service has been allocated by the partner indicated in the PARTNER field (illustratively, 8), an END USER TYPE field including an indication of the type of end user to which the virtual Ethernet service has been allocated by the customer indicated in the CUSTOMER TYPE field, a SERVICE AREA field including an indication of a location in which the virtual Ethernet service is provided (illustratively, 128), a TYPE field including an indication of a service area type of the service area indicated in the SERVICE AREA field (illustratively, 16), an EXPANSION field including additional service attributes (packet, circuit, SLA metrics), a VSR SERVICES field including a service identifier of the virtual Ethernet service (illustratively, 512000), a VSR UNI/NNI field including an indication of the type of interface of the virtual Ethernet service (illustratively, 4), a PROTOCOL TYPE field including an indication of the protocol type of the virtual Ethernet service (illustratively, 8), a VSR SERVICE TYPE field including an indication of the service type of the virtual Ethernet service (illustratively, 4), an EVC field including an identifier of the Ethernet Virtual Connection of the virtual Ethernet service (illustratively, 8), a WVC field including an identifier of a wavelength virtual connection of the virtual Ethernet service (illustratively, 8), a SOURCE ADDRESS field including a source address of the virtual Ethernet service, a DESTINATION ADDRESS field including a destination address of the virtual Ethernet service, and a VSR STATE field including an indication of the state of the virtual Ethernet service (e.g., In Service (IS), Out-of-Service (OOS), AU (degrade), AU (fail), or the like, which, illustratively, has a value of 8). It will be appreciated that the above-described fields of VSR data structure 720 may be defined in different ways, include other types of information, or the like. It will be appreciated the VSR data structure 720 may include fewer or more fields of information. It will be appreciated that VSR data structure 720 is an exemplary data structure for a particular type of virtualized service resource (namely, a virtual Ethernet service) and that other data structures may be used for other types of virtualized service resources (e.g., including less or more, as well as different, information or the like).

As discussed herein, virtualization of IRs of an NI of a CN provides a VNI including VIRs which may be used by various entities. The VIRs of the VNI of the CN may be managed in various ways, which may include allocation of VIRs to entities (e.g., based on hierarchical arrangements of entities), administration of VIRs by entities (e.g., based on hierarchical arrangements of entities and VIR administration policies), use of various applications to support management of VIRs (e.g. allocation, administration, reporting, or the like), or the like, as well as various combinations thereof.

Figure 8:
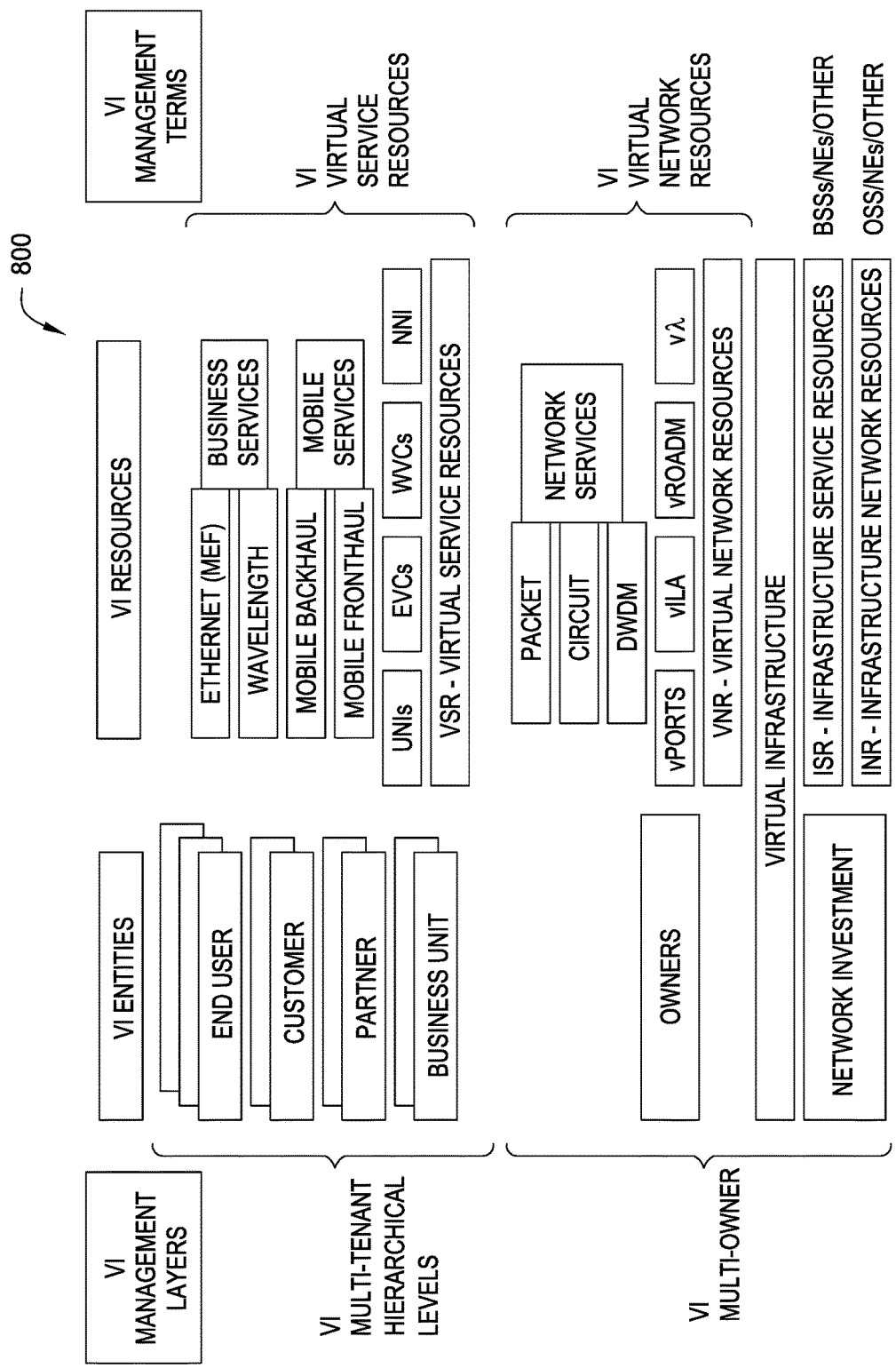
FIG. 8 depicts an exemplary representation of use of infrastructure virtualization, including allocation of virtualized infrastructure resources, to provide a virtualized infrastructure for a communication network.

The allocation of VIRs to and by owners and tenants may be performed hierarchically based on the hierarchical arrangement of the owners and tenants. The VIRs may be allocated to multiple owners, such that the NI of the CN may be shared by multiple owners. The VIRs allocated to an owner may be further allocated by that owner to one or more business unit tenants (e.g., wholesale business units, retail business units, or the like). The VIRs allocated to a business unit tenant may be further allocated by that business unit tenant to one or more partner tenants. The VIRs allocated to a partner tenant may be further allocated by that partner tenant to one or more customer tenants. The VIRs allocated to a customer tenant may be further allocated by that customer tenant to one or more end user tenants. The allocation of VIRs to and by owners and tenants may be performed responsive to requests, based on resource allocation schedules, based on resource allocation predictions, or the like, as well as various combinations thereof. The allocation of VIRs to and by owners and tenants may be performed by updating VIR data structures of the VIRs being allocated to reflect the allocation of the VIRs. For example, infrastructure virtualization may support multi-business unit (e.g., Infrastructure, Retail, or Wholesale BUs), multi-partner (e.g., Mobile, System Integrator, Cloud, Enterprise, or the like), multi-customer (e.g., various enterprise industry segments), and multi-end user (enterprise group IT, R&D, Production, S&M, or the like) virtualized resource allocation functions. The hierarchical allocation of VIRs to entities may be further understood by way of reference to FIG. 8, which depicts an exemplary representation of use of infrastructure virtualization to provide a virtualized infrastructure for a communication network (illustratively, an Ethernet over fiber network). The representation 800 of FIG. 8 illustrates various VIRs which may be allocated to various VI entities (including owners and tenants, which are arranged hierarchically).

Figure 9:
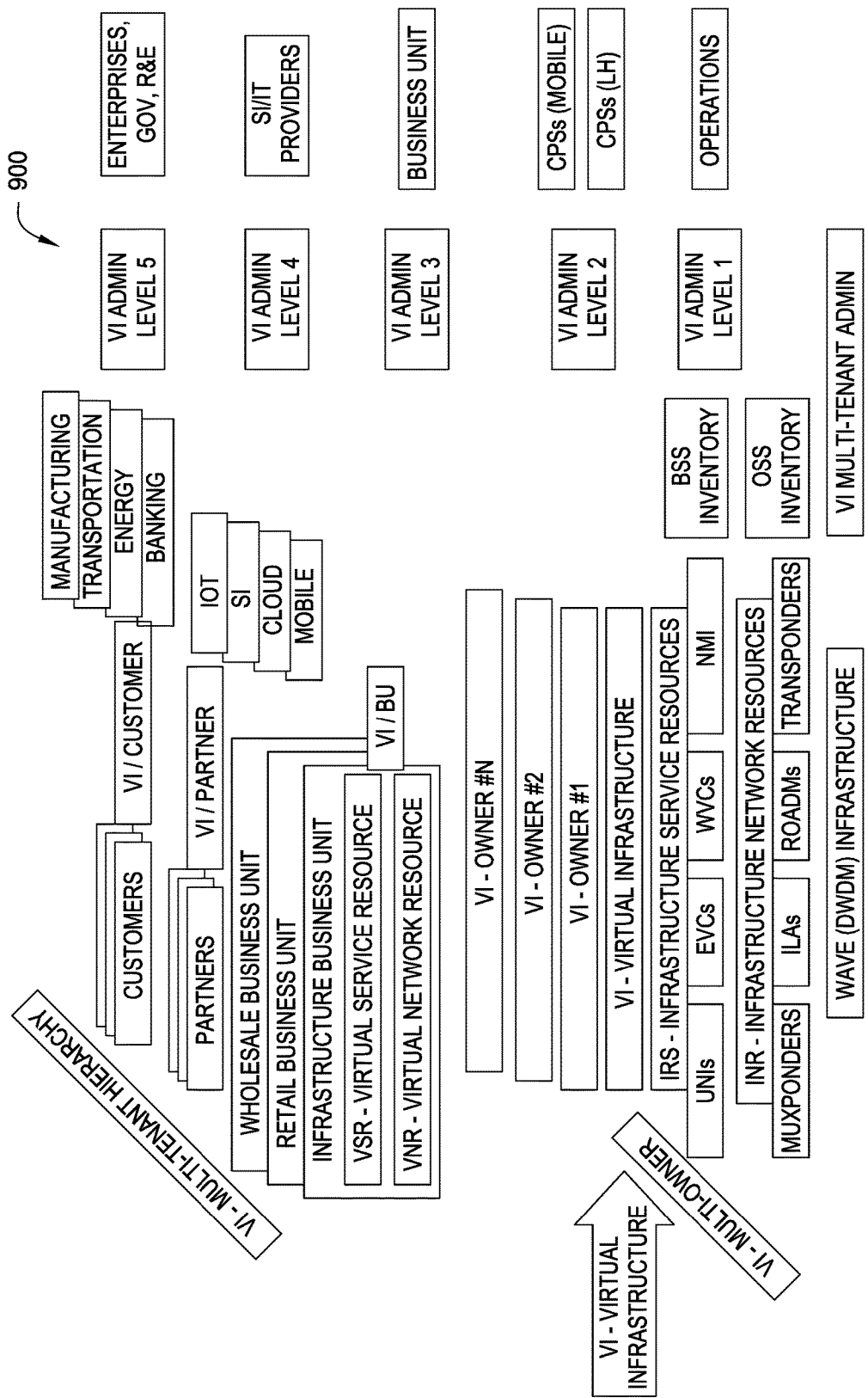
FIG. 9 depicts an exemplary representation of use of infrastructure virtualization, including administration of virtualized infrastructure resources, to provide a virtualized infrastructure for a communication network.

The administration of VIRs by owners and tenants may be performed hierarchically based on the hierarchical arrangement of the owners and tenants. An end user tenant may be responsible for administration of VIRs allocated to that end user tenant. A customer tenant may be responsible for administration of VIRs allocated to that customer tenant, including any VIRs allocated by that customer tenant to end user tenants. A partner tenant may be responsible for administration of VIRs allocated to that partner tenant, including any VIRs allocated by that partner tenant to customer tenants. A business unit tenant may be responsible for administration of VIRs allocated to that business unit tenant, including any VIRs allocated by that business unit tenant to partner tenants. An owner may be responsible for administration of VIRs allocated to that owner, including any VIRs allocated by that owner to business unit tenants. The administration of VIRs may include monitoring, reporting, notification, metrics, or the like, as well as various combinations thereof. For example, infrastructure virtualization may support multi-business unit (e.g., Infrastructure, Retail, or Wholesale BUs), multi-partner (e.g., Mobile, System Integrator, Cloud, Enterprise, or the like), multi-customer (e.g., various enterprise industry segments), and multi-end user (enterprise group IT, R&D, Production, S&M, or the like) virtual resource operations (vOAM) from allocation to reporting. The hierarchical administration of VIRs by entities may be further understood by way of reference to FIG. 9, which depicts an exemplary representation of use of infrastructure virtualization to provide a virtualized infrastructure, including administration of VIRs, for a communication network (illustratively, an Ethernet over fiber network). The representation 900 of FIG. 9 illustrates various VI entities (including owners and tenants, which are arranged hierarchically) and associated administration levels for the VI entities.

The administration of VIRs by owners and tenants may be performed based on VIR administration policies. The administration policies may dictate the types of administration operations which may be performed by different entities. For example, administration operations may include requests for information, provisioning operations, operations for in-service trouble shooting (TS-IS), operations for out-of-service troubleshooting (TS-OOS), viewing privileges, or the like, as well as various combinations thereof. It is noted that a single type of administration policy may be used for managing VIRs (e.g., a common type of policy for both VNRs and VSRs), different types of administration policies may be used for managing different types of VIRs (e.g., different types of policies for VNRs and VSRs), or the like. It is noted that exemplary administration policies for VIRs are depicted and described with respect to FIGS. 10A (for VNRs) and 10B (for VSRs).

FIGS. 10A and 10B depict exemplary administration policies for virtualized infrastructure resources.

FIG. 10A depicts an exemplary administration policy for VNRs. The VNR administration policy 1010 depicts administration privileges for different types of administration operations (illustratively, requests for information (R), provisioning operations (P), operations for TS-IS (T-IS), operations for TS-OOS (T-OOS), and viewing privileges (V)) which may be performed for VNRs. The VNR administration policy 1010 indicates the VNR hierarchical levels at which VNR administration may be performed (indicated horizontally by the columns) and the VNR administration levels (indicated vertically in the column to the left). The VNR hierarchical levels at which VNR administration may be performed may include a Level 1 NOC Administrator level (denoted as NOC Admin Level 1), an Owner level for the Service Provider SP-1 that owns the VNRs (denoted as Owner SP-1), a Wholesale Business Unit level for a Wholesale Business Unit of SP-1 (denoted as SP-1 Wholesale BU), a Partner level for Partners of the Wholesale Business Unit of SP-1 (denoted as Partner), a Customer level for Customers of Partners of the Wholesale Business Unit of SP-1 (denoted as Customer), and an End User level for End Users of Customers of Partners of the Wholesale Business Unit of SP-1 (denoted as End User). The VNR administration levels are indicated using NOC Admin Level 1, Owner SP-1, Business Unit, Partner, Customer, and End User. It is noted that an X at the intersection of one of the VNR hierarchical levels and one of the VNR administration levels, for a particular type of administration operation, indicates that the administration operation may be performed by that VNR administration level for VNRs of that VNR hierarchical level. For example, considering the row associated with the NOC Admin Level 1 administration level, it may be seen that an administrator at the NOC Admin Level 1 level is permitted to perform all administration operations for VNRs allocated to NOC Admin Level 1, VNRs allocated to Owner SP-1, VNRs allocated to SP 1 Wholesale BU, VNRs allocated to Customers, and VNRs allocated to End Users, and is permitted to perform only a subset of the administration operations for VNRs assigned to Partners (illustratively, T-OOS is not permitted). Similarly, for example, considering the row associated with the Business Unit administration level, it may be seen that an administrator at the Business Unit level may not perform any administration operations for VNRs allocated to NOC Admin Level 1 or Owner SP-1, may perform all administration operations with the exception of P operations for VNRs allocated to SP-1 Wholesale BU, and may only perform T-IS and V operations for VNRs allocated to Partners, Customers, and End Users. Similarly, for example, considering the row associated with the End Users administration level, it may be seen that an administrator at the End User level may only perform administration operations (and only a subset of the administration operations that includes T-IS and V operations) for VNRs allocated to that End User. It will be appreciated that various aspects of VNR administration policy 1010 may be modified while still supporting administration functions within the context of infrastructure virtualization (e.g., supporting fewer or more (as well as different) administration operations, supporting fewer or more (as well as different) VNR hierarchical levels, supporting fewer or more (as well as different) VNR administration levels, supporting different combinations of administrative privileges for the administrative operations for different hierarchical levels or types of entities, or the like, as well as various combinations thereof).

FIG. 10B depicts an exemplary administration policy for VSRs. The VSR administration policy 1020 depicts administration privileges for different types of administration operations (illustratively, requests for information (R), provisioning operations (P), operations for TS-IS (T-IS), operations for TS-OOS (T-OOS), and viewing privileges (V)) which may be performed for VSRs. The VSR administration policy 1020 indicates the VSR hierarchical levels at which VSR administration may be performed (indicated horizontally by the columns) and the VSR administration levels (indicated vertically in the column to the left). The VSR hierarchical levels at which VSR administration may be performed may include an SP Network Operations level (denoted as SP Network Operations), an Retail Business Unit level for the Service Provider SP that owns the VSRs (denoted as SP Retail BU), a Wholesale Business Unit level for a Wholesale Business Unit of the Service Provider SP that owns the VSRs (denoted as SP Wholesale BU), a Partner level for Partners of the Wholesale Business Unit of the SP (denoted as Wholesale Partner), a Wholesale Partner's Customer level for Customers of Partners of the Wholesale Business Unit of the SP (denoted as Whole Partner's Cust), and a Wholesale Partner's Customer's End User level for End Users of Customers of Partners of the Wholesale Business Unit of the SP (denoted as Whole Part Cust's User). The VSR administration levels are indicated using SOC Admin Level 1, Owner SP-1, Business Unit, Partner, Customer, and End User. It is noted that an X at the intersection of one of the VSR hierarchical levels and one of the VSR administration levels, for a particular type of administration operation, indicates that the administration operation may be performed by that VSR administration level for VSRs of that VSR hierarchical level. For example, considering the row associated with the SOC Admin Level 1 administration level, it may be seen that an administrator at the SOC Admin Level 1 level is permitted to perform all administration operations for VSRs allocated to SP Network Operations, VSRs allocated to the Retail Business Unit of the Service Provider SP, VSRs allocated to the Wholesale Business Unit of the Service Provider SP, VSRs allocated to Partners of the Wholesale Business Unit of the Service Provider SP, VSRs allocated to Customers of Partners of the Wholesale Business Unit of the Service Provider SP, and VSRs allocated to End Users of Customers of Partners of the Wholesale Business Unit of the Service Provider SP. Similarly, for example, considering the associated with the Business Unit administration level, it may be seen that an administrator at the Business Unit level may not perform any administration operations for VSRs allocated to the SOC Admin Level 1 or the Retail Business Unit of the Service Provider SP, and may perform all administration operations with the exception of P operations for VSRs allocated to tenants at each of the other hierarchical levels (illustratively, VSRs allocated to the Wholesale Business Unit of the Service Provider SP, VSRs allocated to Partners of the Wholesale Business Unit of the Service Provider SP, VSRs allocated to Customers of Partners of the Wholesale Business Unit of the Service Provider SP, and VSRs allocated to End Users of Customers of Partners of the Wholesale Business Unit of the Service Provider SP). Similarly, for example, considering the row of VSR administration level associated with End Users, it may be seen that an administrator at the End User level may only perform administration operations (and only a subset of the administration operations that includes T-IS and V operations) for VSRs allocated to End Users of Customers of Partners of the Wholesale Business Unit of the Service Provider SP). It will be appreciated that various aspects of VSR administration policy 1020 may be modified while still supporting administration functions within the context of infrastructure virtualization (e.g., supporting fewer or more (as well as different) administration operations, supporting fewer or more (as well as different) VSR hierarchical levels, supporting fewer or more (as well as different) VSR administration levels, supporting different combinations of administrative privileges for the administrative operations for different hierarchical levels or types of entities, or the like, as well as various combinations thereof).

As discussed herein, the hierarchical arrangement of the owners and tenants supports hierarchical management of the VIRs by and for the owners and tenants (e.g., hierarchical allocation of VIRs in a top-down direction from owners toward end users, hierarchical administration in a bottom-up direction from end users toward owners, and so forth).

The management of VIRs (e.g., allocation, administration, or the like) may be supported using various applications (APPs) which may be referred to herein as virtualized infrastructure management applications.

The APPs may include virtualized infrastructure ownership (VIO) APPs. The VIO APPs may enable two or more owners of (or investors in) a network infrastructure to have virtual resource ownership. The VIO APPs may be configured to move NRs to VNRs at the infrastructure level. The VIO APPs may be made available at various levels of granularity (e.g., per owner, per network element, or the like, as well as various combinations thereof). The VIO APPs may be configured to lower costs (e.g., lower total TCO at the metro, regional, national, or global level).

The APPs may include virtualized infrastructure multi-tenant (VIMT) APPs. The VIMT APPs may leverage the fact that many service providers which build and operate networks may have business units that offer some mixture of retail, wholesale, and infrastructure services to both internal and external groups. For example, as well as selling direct services, service providers could offer virtual infrastructure slices to partners, those partners could in-turn market and sell services to their partners and customers, and so forth. The VIMT APPs may include VI business unit (VIBU) APPs which may be configured to support hierarchical inventory, KPIs, and SLA reports per BU (e.g., where VNR per BU may refer to VNRi (infrastructure BU)+VNRr (Retail BU)+VNRw (Wholesale BU)). The VIMT APPs may include VI partner (VIP) APPs which may be configured to support hierarchical inventory, KPIs, and SLA reports per partner (e.g., where VNR per partner refers to VNRwp (Wholesale Partner #1, Partner #2, and so forth). The VIMT APPs may include VI customer (VIC) APPs which may be configured to support inventory, KPIs, and SLA reports per customer as well as offering end user reports to internal groups (e.g., where VNR per Customer refers to VNRwpc (Wholesale Partner #1 Customer #1, Partner #2 Customer #1, and so forth). The VIMT APPs may include VNR APPs, which may include NR and VNR discovery applications (e.g., discovery per tenant), VNR reporting applications (e.g., per entity), VNR provisioning applications, VNR troubleshooting applications, or the like, as well as various combinations thereof. The VIMT APPs may include VSR APPs, which may include SR and VSR discovery applications (e.g., discovery per tenant), VSR reporting applications (e.g., per entity), VSR provisioning applications, VSR troubleshooting applications, or the like, as well as various combinations thereof. The VIMT APPs may include various combinations of the above-described VIMT APPs.

The APPs may include VI operations APPS. The VI operations APPs may include applications providing VI business analytics per tenant. For example, applications providing VI business analytics per tenant may include applications providing VSR analytics per owner or BU, applications providing VNR analytics per owner or BU, applications providing VSR analytics per tenant per customer (which may be provided as a service), or the like, as well as various combinations thereof. The VI operations APPs may include applications providing VI business analytics per metric. For example, applications providing VI business analytics per metric may include applications providing per-metric VI business analytics per location (e.g., building, zone, city, regional, national, global, or the like), for churn over time (e.g., year, quarter, month, or the like), for return on investment (ROI) over time and location, for resource utilization (e.g., in-service, out-of-service, network equipped, network unequipped, or the like), for new revenue opportunity (e.g., report on in-service, assigned and unassigned resources per region, report on resources per metro, report on resources per building), for providing potential sales information to BUs and partners, for resource ready threshold crossing business alerts, or the like, as well as various combinations thereof.

The APPs may include various other types of APPs which may be used to support infrastructure virtualization.

The use of infrastructure virtualization, including various aspects thereof, may support various types of virtualized infrastructure analytics. The virtualized infrastructure analytics may include virtualized infrastructure resource analytics (e.g., for VNRs, VSR, or the like, as well as various combinations thereof). The virtualized infrastructure resource analytics may include one or more of VNR/VSR allocation and churn per time period (e.g., week, month, quarter, year, or the like), VNR/VSR allocation & churn per location (e.g., building, COLO, metro, national, global), VNR/VSR activity reports (e.g., per tenant, per time, per location, or the like), or the like, as well as various combinations thereof. The analytical data generated based on the virtualized infrastructure resource analytics may include various other types of data. The analytical data generated based on the virtualized infrastructure resource analytics may be sold per partner to aid in marketing, sales, and business return on investment (ROI). The analytical data generated based on the virtualized infrastructure resource analytics may be used by network organizations to pre-build or move network resources to meet demand. The analytical data generated based on the virtualized infrastructure resource analytics may be used by service organizations to track hot business areas and look for potential new clients. The analytical data generated based on the virtualized infrastructure resource analytics may be used for various other purposes.

The use of infrastructure virtualization, including various aspects thereof, may provide various values. In at least some cases, values associated with at least some embodiments of a multi-ownership, multi-tenancy, network and service resource hierarchy may be complex. In at least some emerging ecosystems, for example, resource ownership and partnering may be rather complex with CSPs, ICPs, CNPs, and SIs all trying to secure enterprise customers while each segment is exploiting the Internet, IP, and cloud network models. In at least some cases, for example, cloud players may be attempting to build their own solutions and market to other cloud players and end users. For at least some consumers, for example, the Internet model is rather simple and the infrastructure is invisible. For at least some enterprise private clouds, for example, public clouds and hybrid clouds are become more complex over time. The various values associated with the various aspects of infrastructure virtualization may be further understood by way of reference to an exemplary VI value cube as depicted in FIG. 11A and an exemplary VI value index as depicted in FIG. 11B.

Figure 11A:
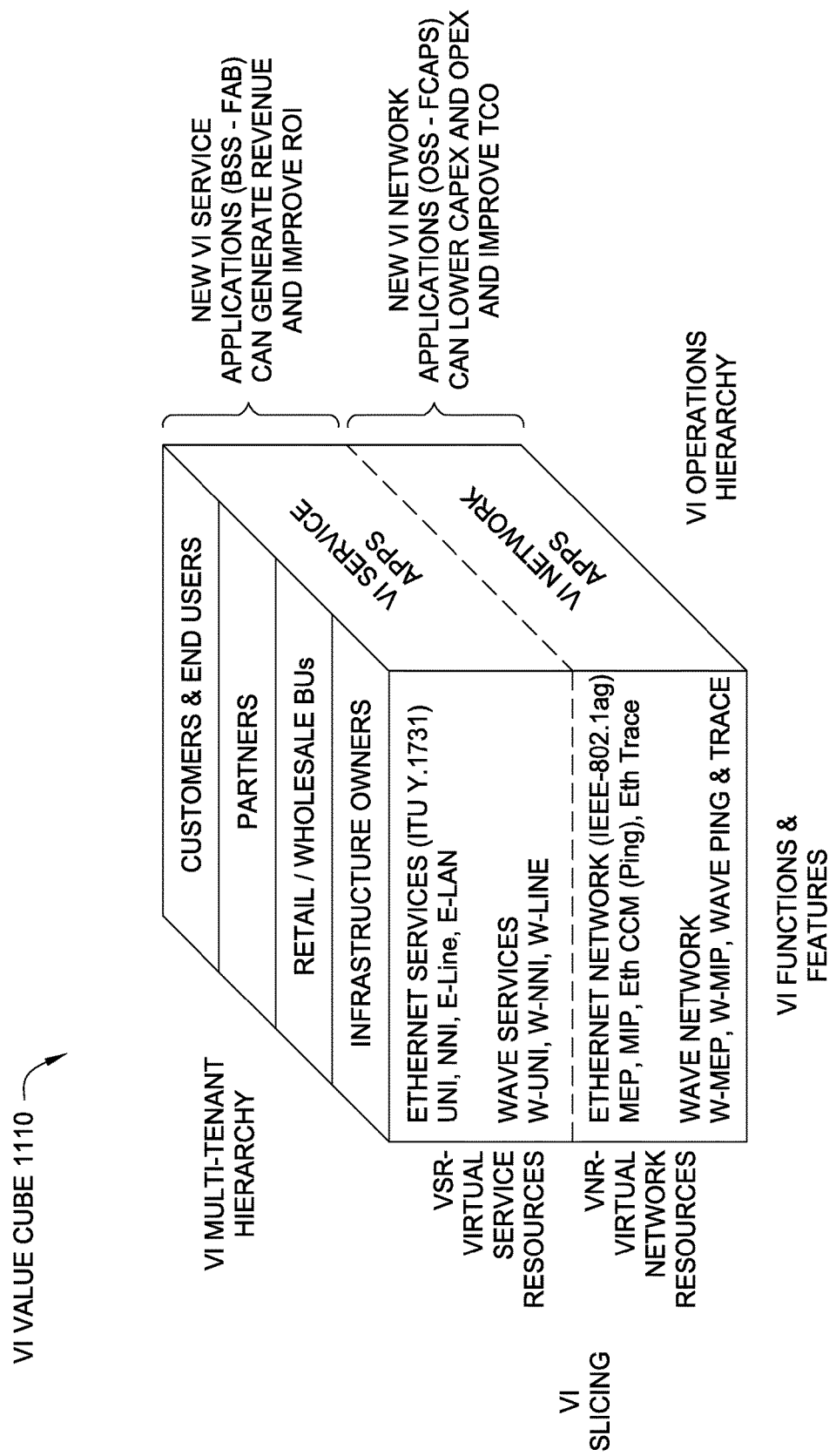
FIGS. 11A and 11B depict an exemplary VI value cube and an exemplary VI value index for embodiments of infrastructure virtualization.
Figure 11B:
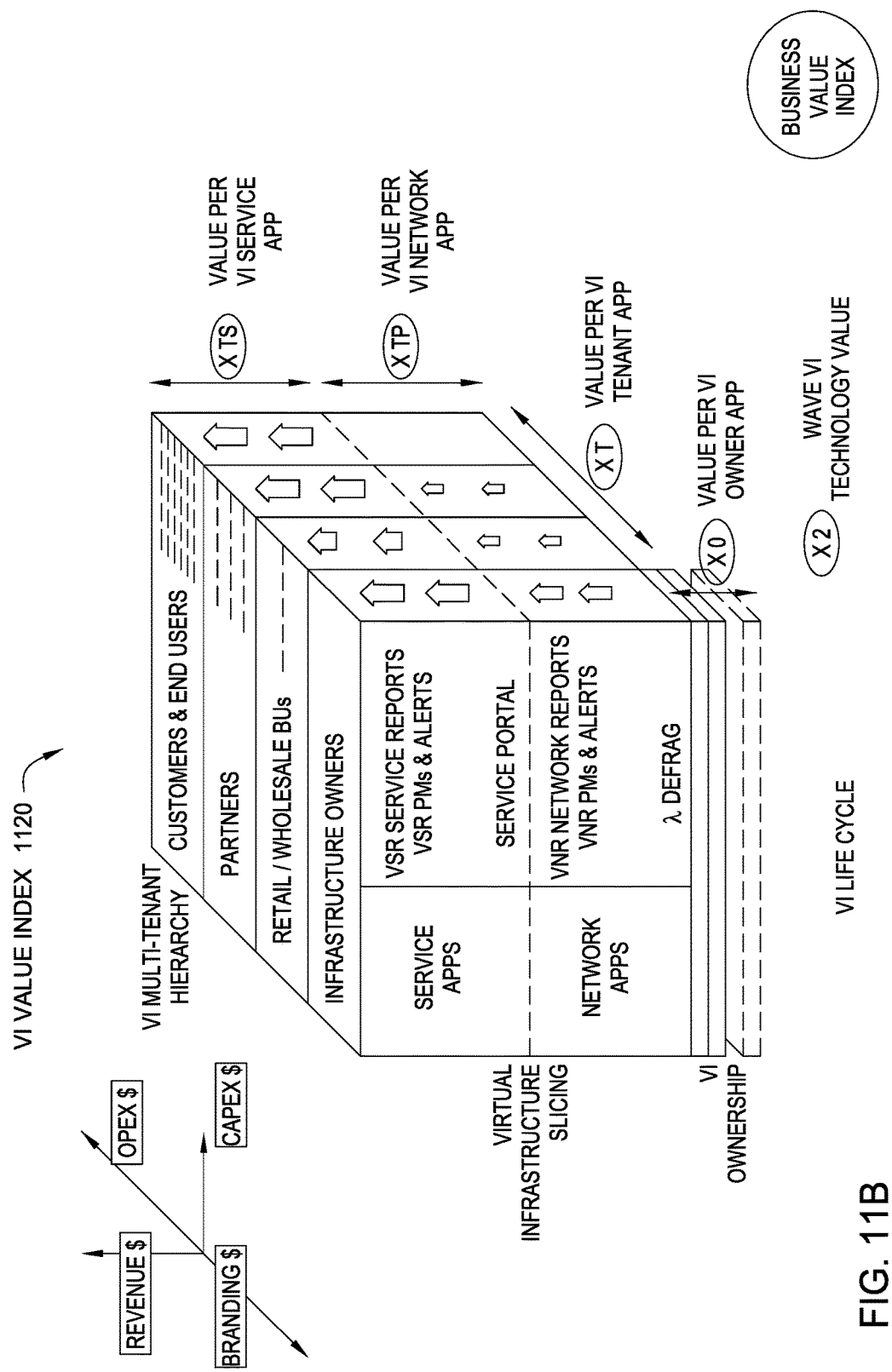

FIGS. 11A and 11B depict an exemplary VI value cube and an exemplary VI value index for embodiments of infrastructure virtualization.

FIG. 11A depicts an exemplary VI value cube for embodiments of infrastructure virtualization. The VI value cube 1110 is configured to represent various aspects of infrastructure virtualization, and may be used to aid in defining various technical and business virtualization goals. The VI value cube 1110 includes a number of dimensions, including a VI slicing dimension indicative as to the manner in which the IRs are virtualized (or sliced) to provide the VIRs, a VI multi-tenancy dimension indicative of the various hierarchical layers of tenants to which the VIRs may be allocated, and a VI applications dimension indicative of network and service applications which may be provided for VIs. The VI slicing dimension of the VI value cube 1110 indicates that, as discussed herein, VIRs may include VNRs (e.g., indicating a separation of infrastructure network resources (NR) and VNR associated at each level of tenancy) and VSRs (e.g., indicating a separation of SR and VSR at each level of tenancy). The VI slicing dimension of the VI value cube 1110 indicates that, as discussed herein, the VIRs may be allocated at various hierarchical levels which may include an infrastructure owner level (e.g., the infrastructure owner usually associated with Communications Service Providers infrastructure Business Unit), a VI Business Units level (e.g., virtual infrastructure business units usually associated with Communications Service Providers which have retail and wholesale BUs), a VI Partners level (e.g., the virtual infrastructure partners are usually large end customers that require major investments in network or service resources, which may include retail and wholesale partner providers such as mobile, cloud, and system integrator partners that may resell managed services to other smaller customers and end users), a VI Customers/End Users Level (e.g., the virtual infrastructure customers and end users include enterprise and business customers, which may sometimes be referred to as commercial customers). The VI applications dimension of the VI value cube 1110 indicates that, as discussed herein, various virtualized infrastructure management applications may be supported (e.g., various VNR APPs, VSR APPs, or the like may be provided to various tenants).

FIG. 11B depicts an exemplary VI value index for embodiments of infrastructure virtualization. The VI value index 1120 is configured to represent various aspects of infrastructure virtualization, and may be used to aid in defining resource models, prioritizing virtualization (e.g., prioritizing IRs to be virtualized to provide corresponding VIRs), determining the manner in which IRs are virtualized, indicating the type of value which will or may be provided by virtualizing particular IRs (e.g., will virtualization offer a network value, a service value, a business value, or some combination thereof), or the like, as well as various combinations thereof). The VI value index 1120 includes a number of indices, including a VI wave technology value index, a VI ownership application value index, a VI multi-tenant application value index, a VI VSR applications value index, and a VNR applications value index. The VI wave technology value index (VI technology lifecycle×2) indicates that the life cycle of wavelength technology versus IP technology is based on typical product life cycle or amortization rate (e.g., IP switching and routing products may have 3-5 year lifetimes whereas optical/DWDM products may have 8-10 year lifetimes). The VI multi-tenant application value index (VI ownership=×2 or more) enables two or more owners to share a virtualized infrastructure DWDM investment, which allows for dedicated, shared, or pooled resources. The VI multi-tenant application value index (VI Multi-Tenant=xT (xBU+yPartners) may be important as it enables more business units and partners to each have more customers than a single provider and may be extended to municipal infrastructure supporting various municipal solutions, public safety, traffic control, security, health, BBA initiatives, municipal/industrial IOT, or the like. It is noted, with respect to the VI multi-tenant application value index, that the VI Network APPs shown in the bottom portion of the VI value cube 1110 may have high value to the Infrastructure BU, and may have less value across the hierarchy of tenants (e.g., end users may not value path computation or wavelength defragmentation applications that recover bandwidth similar to how disk defragmentation may find additional storage in a PC). It also is noted, with respect to the VI multi-tenant application value index, that the VI Service APPs shown in the top portion of the VI value cube 1110 may offer higher value to every level of tenancy. For example, the value of SLA reporting and/or a service portal may offer less value to Infrastructure BU, but be of high value to wholesale and retail BUs, wholesale partners (e.g., SI, Cloud, and Mobile) as well as end customers (e.g., enterprises in banking through manufacturing). For example, end users may value both monthly SLA reports and/or real time SLA metrics via a self-server portal, partners and BUs can customize reports and portal features to offer differentiated features (email or text notifications of faults or threshold (changes in delay or performance)), and so forth. The VI VSR applications value index is associated with VSR APPs which can be provided for a range of service functions and features that may have high value for various levels of the multi-tenant hierarchy. For example, VSR APPs may include VSR reporting applications which may report SLA metrics (e.g., on VSRs, per tenant in the hierarchy, at various levels of granularity and time scales (e.g., real-time, monthly, quarterly, yearly, or the like)), VSP portal applications which may offer a portal to each level of the multi-tenant hierarchy for updates at various levels of granularity and time scales (e.g., real-time, monthly, quarterly, yearly, or the like)), may offer service support escalation per client service level (e.g., end users may escalate to customers, customers may escalate to partners, partners may escalate to BUs, and BUs may escalate to owners). The VNR applications value index is associated with VNR APPs which can be provided for a range of functions and features that may have various levels of value for various levels of the multi-tenant hierarchy. For example, VNR APPs may include VNR discovery applications which may discover VNRs at various levels of granularity (e.g., per tenant per location/geography (e.g., building, metro, regional, and nationally in the hierarchy (e.g., inventory, state, transition notification, or the like)), discovery VNRs per tenant in the hierarchy (e.g., inventory, state, transition notification, or the like), or the like, as well as various combinations thereof. For example, VNR APPs may include VNR reporting applications which may report on VNRs per tenant in the hierarchy at various levels of granularity and time scales (e.g., real-time, monthly, quarterly, yearly, or the like).

Figure 12:
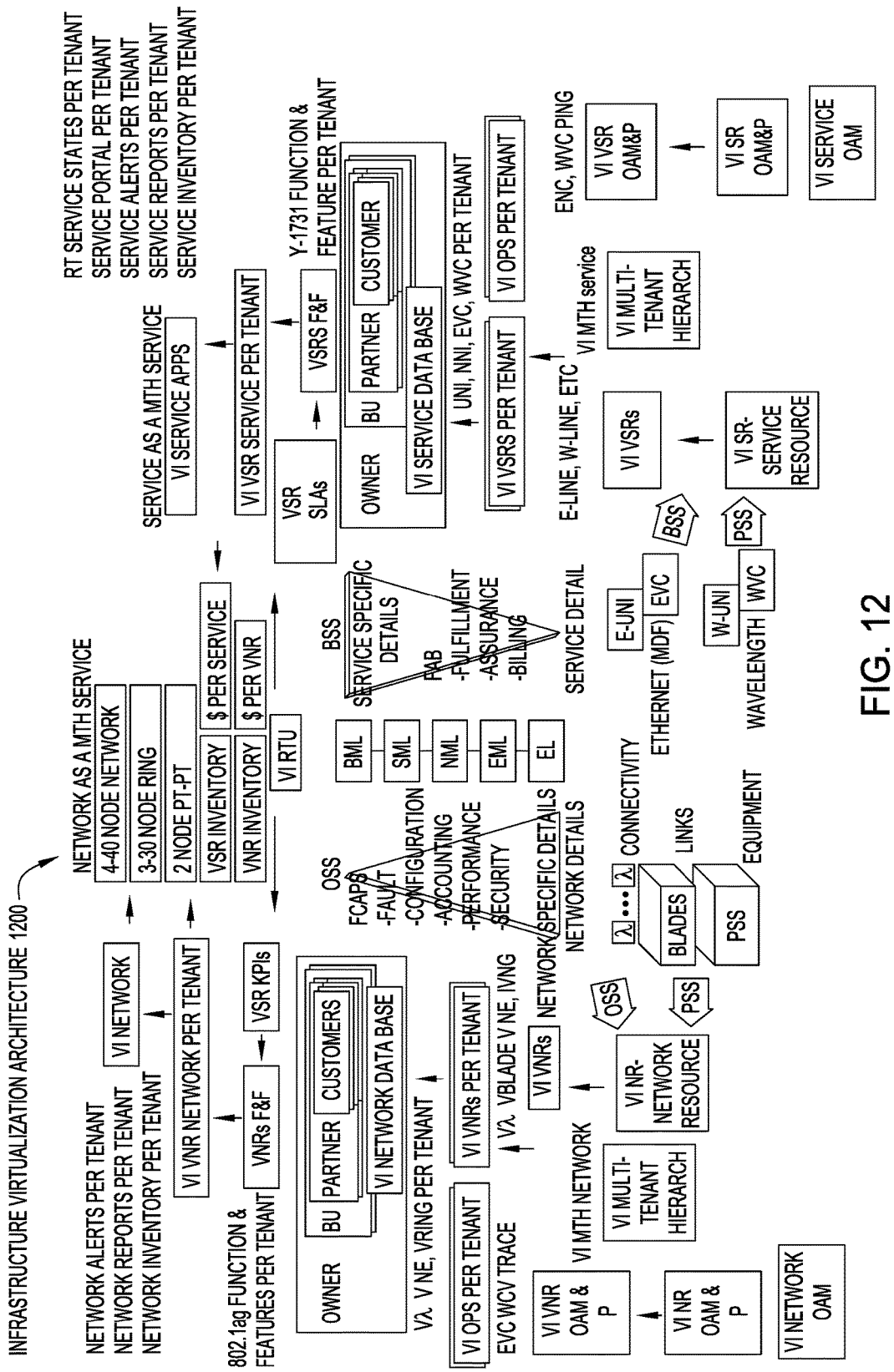
FIG. 12 depicts an exemplary infrastructure virtualization architecture configured to provide a virtualized infrastructure for a communication network.

FIG. 12 depicts an exemplary infrastructure virtualization architecture configured to provide a virtualized infrastructure for a communication network. As depicted in FIG. 12, infrastructure virtualization architecture 1200 includes various elements configured to provide a virtualized infrastructure for a communication network. The infrastructure virtualization architecture 1200 includes various elements associated with virtualization of infrastructure resources of a communication network to provide a virtualized infrastructure for the communication network. For example, infrastructure virtualization architecture 1200 includes network elements supporting network resources which may be virtualized to provide virtualized network resources and service resources which may be virtualized to provide virtualized service resources. For example, infrastructure virtualization architecture 1200 includes support systems (e.g., OSSs, BSSs, and the like), which may provide information which may be processed to provide virtualization of infrastructure resources to provide virtualized infrastructure resources (e.g., information associated with network elements of the communication network), which may support control over configuration of network elements to support the virtualized infrastructure resources (e.g., via messaging with network elements of the communication network), which may support management of the virtualized infrastructure resources (e.g., via messaging with network elements of the communication network, various other management systems, or the like, as well as various combinations thereof), or the like, as well as various combinations thereof. For example, infrastructure virtualization architecture 1200 includes hierarchical arrangements of virtualized infrastructure resources. For example, infrastructure virtualization architecture 1200 supports hierarchical management of virtualized infrastructure resources. These and various other capabilities of infrastructure virtualization architecture 1200 may be further understood by way of reference to other figures provided herein.

Figure 13:
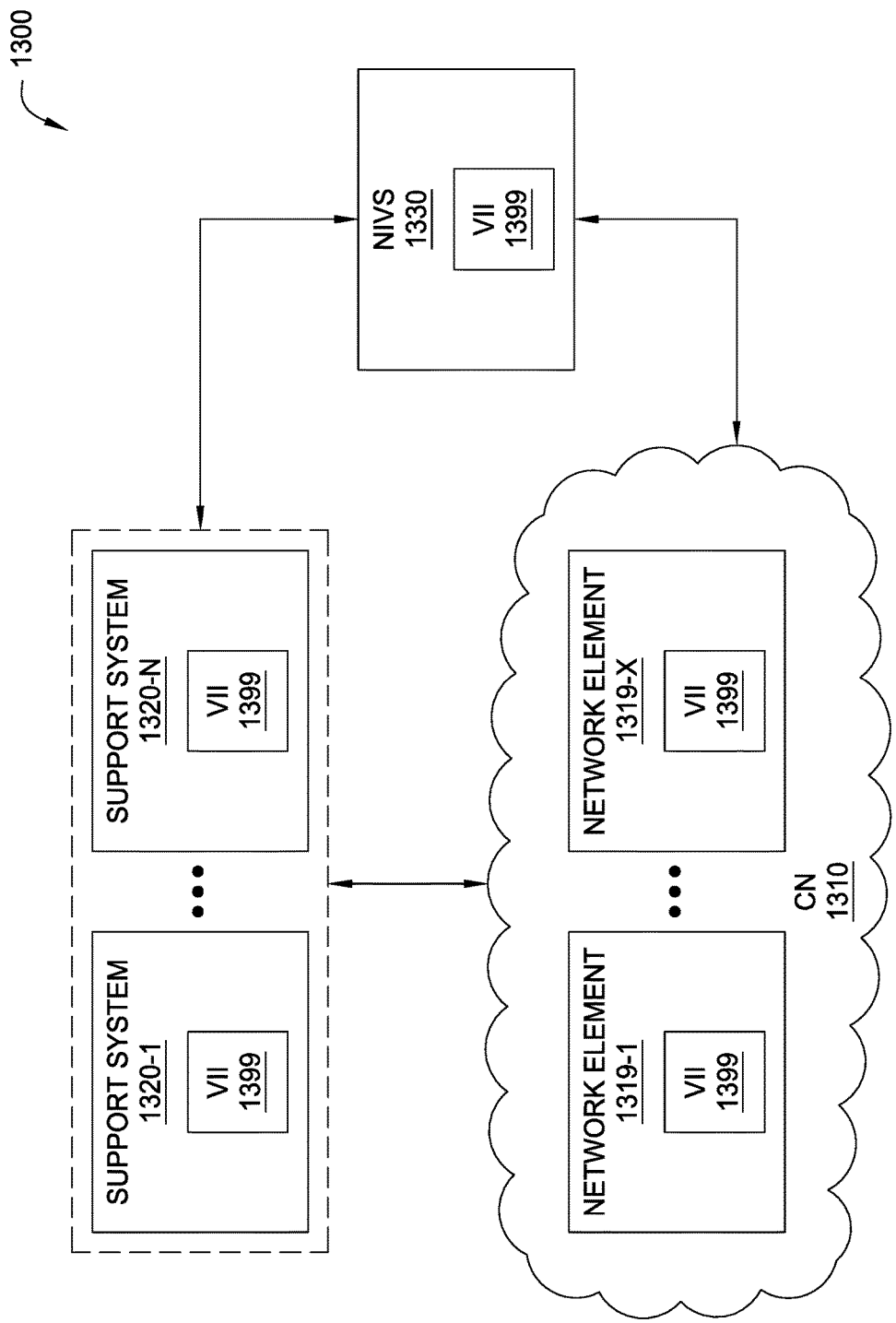
FIG. 13 depicts portions of a system configured to support network infrastructure virtualization to provide a virtualized infrastructure for a communication network.

FIG. 13 depicts portions of a system configured to support network infrastructure virtualization to provide a virtualized infrastructure for a communication network. As depicted in FIG. 13, system 1300 includes a CN 1310 (which may be similar to CN 110 of FIG. 1), a set of SSs 1320-1-1320-N (which may be similar to SSs 120 of FIG. 1) and a NIVS 1330 (which may be similar to NIVS 130 of FIG. 1). As discussed herein, various aspects of network infrastructure virtualization to provide a virtualized infrastructure for a communication network, including both creation and use of a virtualized infrastructure for a communication network, may involve various types of communications (e.g., various types of messages, various types of information, or the like, as well as various combinations thereof) between various elements. The communications may include requests for information, reports of information, requests for resource allocation, reports of resources allocated, configuration instructions or commands, or the like, as well as various combinations thereof. The communications may include various types of information associated network infrastructure virtualization to provide a virtualized infrastructure for a communication network, including creation and use of a virtualized infrastructure for a communication network. The communication of such information is represented as virtualized infrastructure information (VII) 1399, which is depicted as being stored on NEs 1319 of CN 1310, SSs 1320, and NIVS 1330. It will be appreciated that although depicted using a common designator of VII 1399, the types of VII 1399 stored on the different element types (e.g., NEs 1319 versus SSs 1320 versus NIVS 1330) may be different. For examples, NIVS 1330 may store full VIR data structures for VIRs, SSs 1320 may store portions of the full VIR data structures for VIRs that are stored by NIVS 1330, and network elements 1319 may store portions of the VIR data structure portions for VIRs that are stored by SSs 1320). For example, NIVS 1330 may store VII 1399 which may be used to configure SSs 1320 to support VIRs, NIVS 1330 may store VII 1399 which may be used to configure network elements 1319 to support VIRs, SSs 1320 may store VII 1399 which may be used to configure network elements 1319 to support VIRs, network elements 1319 may store VII 1399 which may be used to support use of VIRs, or the like, as well as various combinations thereof.

In at least some embodiments, for example, the NIVS 1330 may be configured to support various types of communications.

In at least some embodiments, for example, NIVS 1330 may be configured to provide, to at least one of an SS 1320 or a network element 1319 of CN 1310, a message including at least a portion of a virtualized infrastructure resource data structure including VII for a VIR associated with the network element 1319 The virtualized infrastructure resource data structure including VII may include all or part of a VNR data structure, such as VNR data structure 620 of FIG. 6B (e.g., identifying ownership, multi-tenant hierarchy, VNR details, or the like, as well as various combinations thereof). The virtualized infrastructure resource data structure including VII may include all or part of a VSR data structure, such as VSR data structure 720 of FIG. 7B (e.g., identifying ownership, multi-tenant hierarchy, VSR details, or the like, as well as various combinations thereof). The message may include various other types of information described herein.

In at least some embodiments, for example, NIVS 1330 may be configured to receive, from at least one of an SS 1320 or a network element 1319 of CN 1310, a message related to virtualization of IRs to provide VIRs or to use of VIRs by various entities. The message may be a query result message provided responsive to a query initiated by NIVS 1330, an assignment result message provided responsive to a resource assignment initiated by the NIVS 1330 and/or an SS 1320, an allocation result message provided responsive to a resource allocation initiated by the NIVS 1330 and/or an SS 1320, an administration result message provided responsive to a resource administration message initiated by the NIVS 1330 and/or an SS 1320, or the like, as well as various combinations thereof.

In at least some embodiments, for example, an SS 1320 (e.g., an OSS, a BSS, or the like) may be configured to support various types of communications.

In at least some embodiments, for example, an SS 1320 may be configured to (a) receive, from a management system (e.g., NIVS 1330), a message including at least a portion of a virtualized infrastructure resource data structure including VII for a VIR associated with a network element 1319 of CN 1310 and (b) store at least a portion of the VII of the message for use by the SS 1320 in performing a support function for the network element 1319 (e.g., for the VIR with which the virtualized infrastructure resource data structure including the VII is associated). In at least some embodiments, for example, an SS 1320 may be configured to (a) receive, from a management system (e.g., NIVS 1330), a message including at least a portion of a virtualized infrastructure resource data structure including VII for a VIR associated with a network element 1319 of CN 1310 and (b) initiate a support function for the network element 1319 (e.g., for the VIR with which the virtualized infrastructure resource data structure including the VII is associated) based on the VII included in the message. In at least some such embodiments, the support function may include a provisioning function (e.g., provisioning the network element 1319 such that a VNR or VSR may be used by an entity), a monitoring function (e.g., performing monitoring on the network element for a VNR or VSR being used by an entity, or the like), an administrative function, or the like, as well as various combinations thereof.

In at least some embodiments, for example, an SS 1320 may be configured to (a) receive, from a network element 1319, a message including information associated with a VIR and (b) store the information associated with the VIR (e.g., for use by the SS 1320 in performing a support function for the network element 1319, for later propagation to a management system (e.g., NIVS 1330), or the like, as well as various combinations thereof). In at least some embodiments, for example, an SS 1320 may be configured to (a) receive, from a network element 1319, a message including information associated with a VIR and (b) propagate at least a portion of the information associated with the VIR toward a management system (e.g., NIVS 1330) for use by the management system in performing a management function for the VIR (e.g., an allocation function, an administrative function, or the like, as well as various combinations thereof).

In at least some embodiments, for example, a network element 1319 (e.g., a router, a switch, an ROADM, or the like) may be configured to support various types of communications.

In at least some embodiments, for example, a network element 1319 may be configured to (a) receive, from a management system (e.g., an SS 1320, NIVS 1330, or the like), a message including at least a portion of a virtualized infrastructure resource data structure including VII for a VIR associated with a network element 1319 of CN 1310 and (b) store at least a portion of the VII of the message for use by the network element 1319 in supporting the VIR with which the virtualized infrastructure resource data structure including the VII is associated (e.g., for assignment of the VIR to an owner, for allocation of the VIR to one or more tenants at one or more hierarchical layers, for enabling use of the VIR by one or more associated entities, for supporting management of the VIR by one or more associated entities, for supporting administration of the VIR by one or more associated entities, or the like, as well as various combinations thereof).

In at least some embodiments, for example, a network element 1319 may be configured to (a) receive, from a management system (e.g., an SS 1320, NIVS 1330, or the like), a message including at least a portion of a virtualized infrastructure resource data structure including VII for a VIR associated with a network element 1319 of CN 1310 and (b) use at least a portion of the VII of the message to support the VIR with which the virtualized infrastructure resource data structure including the VII is associated (e.g., for assignment of the VIR to an owner, for allocation of the VIR to one or more tenants at one or more hierarchical layers, for enabling use of the VIR by one or more associated entities, for supporting management of the VIR by one or more associated entities, for supporting administration of the VIR by one or more associated entities, or the like, as well as various combinations thereof).

It will be appreciated that the VII 1399 may be considered to include any information discussed herein in conjunction with network infrastructure virtualization to provide a virtualized infrastructure for a communication network (including creation and use of virtualized infrastructure for a communication network).

Various embodiments of the network infrastructure virtualization mechanism may support various other network virtualization functions and features. For example, infrastructure virtualization may enable the abstraction of various types of networking and may offer virtualized infrastructure resources to various types of entities (e.g., CSPs, ICPs, CNPs, Enterprises, cloud providers (e.g., system integrators, IT hosting, consumer, commercial, municipalities, governments, or the like), or the like, as well as various combinations thereof. For example, infrastructure virtualization may provide a VNI such that (1) at the database level, the VNI offers new VNRs and VSRs that support the emerging ecosystems of players, partners and products, (2) at the OSS/BSS level, the VNI offers a new hierarchical multi-tenant resources (inventory, policy, resource allocation, and so forth) model, and (3) at the core, metro, and access level, the VNI offers VNR and VSR assets that lower Total Cost of Ownership (TCO) and add accountability for dedicating, sharing, and pooling resources that match business models to solution and service models in use today. For example, where network infrastructure virtualization is applied to a Ethernet-over-fiber metro network at a city level (e.g., where a new infrastructure is required to scale the metro network and support 1G to 100G services over a 10 to 100 Tbps infrastructure network), the Ethernet-over-fiber metro network infrastructure owner could be a CSP, an ICP, or a CNP having both retail and wholesale business units, the BUs can support a range of Partners from top to bottom (e.g., including ICPs, CNPs, SIs, Enterprises, and even Municipalities as they transition to digital cities, and scale IP services supporting e-commerce, cloud computing, industrial IOT, or the like), with per-partner infrastructure slicing options partners could choose their own VNRs and offer a range of VSRs (e.g., wavelength, Ethernet, IP services, or the like), the VI resource allocation can scale up and/or scale down per tenant so that partners can be offered 1G to 10T of dedicated or shared capacity, and each tenant (BU, Partner, Customer, or End User) could be assigned virtualized resources and offered software applications for VNR & VSR ordering, provisioning and reporting per location, per time frame, per project, or the like.

Various embodiments of the network infrastructure virtualization mechanism may provide or tend to provide various other advantages. For example, infrastructure virtualization may support existing, emerging, and future mobile and cloud ecosystem models to scale the Internet, the IOT, or the like. For example, infrastructure virtualization may provide a new hierarchical model for owners and tenants that improves TCO (e.g., lowers CAPEX and OPEX), grows revenues (e.g., improves Return on Investment (ROI)), or the like, as well as various combinations thereof. For example, infrastructure virtualization may obviate the need for building and operating single-operator infrastructure networks and, instead, may offer new solutions for virtualizing infrastructure investments, thereby enabling or potentially enabling lowering of CAPEX since infrastructure investment can be distributed across multiple owners (e.g., enabling CSPs to invest in-territory and out-of-territory, enabling ICPs to invest in global cores and target metros, enabling Mobile ecosystems to invest in shared infrastructure, or the like), lowering of OPEX since network and service operations can be scaled with partners (e.g., enabling CSPs, ICPs, CNPs, Sis, and enterprises to share operations, enabling VNR and VSR resource models per tenant, or the like), improving revenue through new services, new business models, multiple service partners, and so forth (e.g., enabling CSPs, ICPs, CNPs, and retail and wholesale business units, enabling partners for IT, Cloud, Mobile, and industrial IOT, or the like), lowering TCO and building brands for existing and emerging ecosystems (e.g., enabling CSPs, ICPs, and CNPs to co-brand with technology and service partners, such as CSPs plus Cloud, Mobile, and IT Partners, ICPs plus Network & Service Partners, CNPs plus Network, Service, Cloud, and Enterprise Partners, or the like), or the like, as well as various combinations thereof. For example, the VNR asset model may improve bottom line cost allocation and the VSR asset model may improve top line earnings and enable revenue generation (e.g., VSR assets can be offered as services to a hierarchy of tenants, and each tenant, in turn, can offer services and generate revenue on this virtualized infrastructure business model). For example, the multi-tenant hierarchy may build on the shared asset models and offer further reduction of CAPEX and OPEX (e.g., network CAPEX and OPEX can be shared across many tenants (VNRs per tenant) to further lower TCO and each tenant can offer services (VSRs per tenant) to grow revenue and improve ROI). For example, infrastructure virtualization may enable an enhanced infrastructure business model, thereby resulting in an effective way to manage hardware and software assets in the existing, emerging, and future ecosystems. For example, infrastructure virtualization may be configured to lower TCO at various levels (e.g., at one or more of the metro, regional, national or global level), improve ROI, enable additional revenue for both in-territory and out-of-territory businesses, or the like, as well as various combinations thereof. For example, infrastructure virtualization may be used in combination with other types of solutions which may improve communication networks (e.g., SDN solutions, NFV solutions, or the like, as well as various combinations thereof).

It will be appreciated that, although primarily presented herein with respect to embodiments of providing infrastructure virtualization for a particular type of communication network (namely, a DWDM network supporting Ethernet services), infrastructure virtualization may be provided within various other types communication networks.

Figure 14:
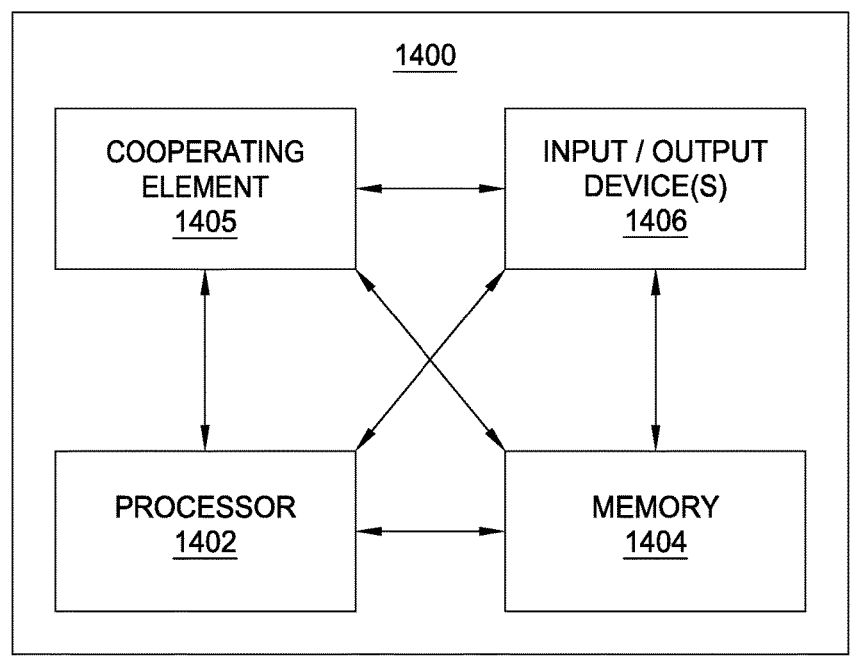
FIG. 14 depicts a high-level block diagram of a computer suitable for use in performing various functions described herein.

FIG. 14 depicts a high-level block diagram of a computer suitable for use in performing various functions described herein.

The computer 1400 includes a processor 1402 (e.g., a central processing unit (CPU), a processor having a set of processor cores, a processor core of a processor, or the like) and a memory 1404 (e.g., a random access memory (RAM), a read only memory (ROM), or the like). The processor 1402 and the memory 1404 are communicatively connected.

The computer 1400 also may include a cooperating element 1405. The cooperating element 1405 may be a hardware device. The cooperating element 1405 may be a process that can be loaded into the memory 1404 and executed by the processor 1402 to implement functions as discussed herein (in which case, for example, the cooperating element 1405 (including associated data structures) can be stored on a computer-readable storage medium, such as a storage device or other storage element (e.g., a magnetic drive, an optical drive, or the like)).

The computer 1400 also may include one or more input/output devices 1406. The input/output devices 1406 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1400 of FIG. 14 may represent a general architecture and functionality suitable for implementing functional elements described herein, portions of functional elements described herein, or the like, as well as various combinations thereof. For example, computer 1400 may provide a general architecture and functionality that is suitable for implementing one or more of an element of CN 110, an IR 111 of CN 110, an SS 120, NIVS 130, an element of CN 1310, a network element 1319, an SS 1320, NIVS 1330, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus at least to:
      receive infrastructure information describing infrastructure resources of a network infrastructure of a communication network, wherein the infrastructure resources comprise network resources and service resources;
      process the infrastructure information, based on a set of infrastructure virtualization data structures, to provide virtualized infrastructure information describing virtualized infrastructure resources of a virtualized network infrastructure of the communication network;
         wherein the set of infrastructure virtualization data structures includes at least one infrastructure virtualization data structure including:
            a first set of fields configured to support management of the virtualized infrastructure resources by a set of multiple owners; and
            a second set of fields configured to support hierarchical management of the virtualized infrastructure resources by a set of multiple tenants based on association of respective ones of the fields of the second set of fields with respective levels of a tenant hierarchy for the set of multiple tenants;
         wherein the virtualized infrastructure resources comprise virtualized network resources representing virtualization of the network resources and virtualized service resources representing virtualization of the service resources; and
      manage the virtualized infrastructure resources based on the virtualized infrastructure information describing the virtualized infrastructure resources.

2. The apparatus of claim 1, wherein, to process the infrastructure information based on the set of infrastructure virtualization data structures to provide the virtualized infrastructure information describing the virtualized infrastructure resources of the network infrastructure of the communication network, the at least one memory and the computer program code are configured to, with the at least one processor, cause the apparatus at least to:
   for one of the infrastructure resources:
      extract resource information associated with the one of the infrastructure resources from a data structure including data describing the one of the infrastructure resources; and
      populate a virtualization data structure for the one of the infrastructure resources, to provide thereby a corresponding one of the virtualized infrastructure resources, with a subset of the extracted infrastructure resource information and infrastructure resource virtualization information associated with the one of the infrastructure resources.

3. The apparatus of claim 2, wherein the one of the infrastructure resources is one of the network resources, wherein the data describing the one of the network resources comprises operations support system (OSS) data describing the one of the network resources.

4. The apparatus of claim 2, wherein the one of the infrastructure resources is one of the service resources, wherein the data describing the one of the service resources comprises business support system (BSS) data describing the one of the service resources.

5. The apparatus of claim 2, wherein the infrastructure resource virtualization information associated with the one of the infrastructure resources comprises:
   an indication of an owner of the one of the infrastructure resources;
   an indication of at least one tenant to which the one of the infrastructure resources is allocated; and
   an indication of a status of the one of the infrastructure resources.

6. The apparatus of claim 1, wherein the set of multiple tenants includes at least one of a business unit tenant, a partner tenant, and a customer tenant.

7. The apparatus of claim 1, wherein the set of multiple tenants includes a business unit tenant at a first hierarchical level of the tenant hierarchy, a partner tenant at a second hierarchal level of the tenant hierarchy, and a customer tenant at a third hierarchical level of the tenant hierarchy.

8. The apparatus of claim 1, wherein the at least one memory and the computer program code are configured to, with the at least one processor, cause the apparatus at least to:
   provide at least one virtualized infrastructure resource administration policy configured for use in controlling hierarchical administration of the virtualized infrastructure resources.

9. The apparatus of claim 8, wherein the at least one virtualized infrastructure resource administration policy comprises at least one of:
- a virtualized network resource administration policy configured for use in controlling hierarchical administration of the virtualized network resources; or
- a virtualized service resource administration policy configured for use in controlling hierarchical administration of the virtualized service resources.

10. The apparatus of claim 1, wherein the at least one memory and the computer program code are configured to, with the at least one processor, cause the apparatus at least to:
- provide a set of virtualized infrastructure management applications configured for use in managing the virtualized infrastructure resources.

11. The apparatus of claim 10, wherein the set of virtualized infrastructure management applications comprises:
- at each of at least one of the levels of the tenant hierarchy, one or more virtualized infrastructure management applications configured for use by tenants of the respective level of the tenant hierarchy.

12. The apparatus of claim 10, wherein the at least one memory and the computer program code are configured to, with the at least one processor, cause the apparatus at least to:
- provide, for one of the virtualized infrastructure management applications, a first customized version of the one of the virtualized infrastructure management applications for a first tenant of the set of multiple tenants and a second customized version of the one of the virtualized infrastructure management applications for a second tenant of the set of multiple tenants.

13. The apparatus of claim 1, wherein the at least one memory and the computer program code are configured to, with the at least one processor, cause the apparatus at least to:
- perform monitoring and reporting, for at least a portion of the virtualized infrastructure resources, across multiple entities.

14. The apparatus of claim 1, wherein the at least one memory and the computer program code are configured to, with the at least one processor, cause the apparatus at least to:
- perform data analytics, for at least a portion of the virtualized infrastructure resources across multiple entities, to provide thereby virtualized infrastructure resource analysis data.

15. The apparatus of claim 14, wherein the virtualized infrastructure resource analysis data comprise at least one of virtualized infrastructure resource consumption information, virtualized infrastructure resource churn information, an indication of virtualized infrastructure resource change per entity, an indication of virtualized infrastructure resource change per location, or an indication of virtualized infrastructure resource change per time period.

16. The apparatus of claim 1, wherein, to manage the virtualized infrastructure resources based on the virtualized infrastructure information describing virtualized infrastructure resources, the at least one memory and the computer program code are configured to, with the at least one processor, cause the apparatus at least to:
- communicate with one or more of the network resources based on the virtualized infrastructure information describing the virtualized infrastructure resources.

17. The apparatus of claim 1, wherein, to manage the virtualized infrastructure resources based on the virtualized infrastructure information describing the virtualized infrastructure resources, the at least one memory and the computer program code are configured to, with the at least one processor, cause the apparatus at least to:
- propagate, toward a device, a message comprising an instruction for the device to manage a first portion of a network resource allocated to a first owner;
- propagate, toward the device, a message comprising an instruction for the device to manage a first portion of a service resource, supported by the first portion of the network resource, allocated to the first owner;
- propagate, toward the device, a message comprising an instruction for the device to manage a second portion of the network resource allocated to a second owner; and
- propagate, toward the device, a message comprising an instruction for the device to manage a second portion of the service resource, supported by the second portion of the network resource, allocated to the second owner.

18. A non-transitory computer-readable storage medium storing instructions configured to cause an apparatus to at least:
- receive infrastructure information describing infrastructure resources of a network infrastructure of a communication network, wherein the infrastructure resources comprise network resources and service resources;
- process the infrastructure information, based on a set of infrastructure virtualization data structures, to provide virtualized infrastructure information describing virtualized infrastructure resources of a virtualized network infrastructure of the communication network;
  - wherein the set of infrastructure virtualization data structures includes at least one infrastructure virtualization data structure including:
    - a first set of fields configured to support management of the virtualized infrastructure resources by a set of multiple owners; and
    - a second set of fields configured to support hierarchical management of the virtualized infrastructure resources by a set of multiple tenants based on association of respective ones of the fields of the second set of fields with respective levels of a tenant hierarchy for the set of multiple tenants;
  - wherein the virtualized infrastructure resources comprise virtualized network resources representing virtualization of the network resources and virtualized service resources representing virtualization of the service resources; and
- manage the virtualized infrastructure resources based on the virtualized infrastructure information describing the virtualized infrastructure resources.

19. A method, comprising:
- receiving, by an apparatus, infrastructure information describing infrastructure resources of a network infrastructure of a communication network, wherein the infrastructure resources comprise network resources and service resources;
- processing the infrastructure information, by the apparatus based on a set of infrastructure virtualization data structures, to provide virtualized infrastructure information describing virtualized infrastructure resources of a virtualized network infrastructure of the communication network;
  - wherein the set of infrastructure virtualization data structures includes at least one infrastructure virtualization data structure including:

a first set of fields configured to support management of the virtualized infrastructure resources by a set of multiple owners; and a second set of fields configured to support hierarchical management of the virtualized infrastructure resources by a set of multiple tenants based on association of respective ones of the fields of the second set of fields with respective levels of a tenant hierarchy for the set of multiple tenants;

wherein the virtualized infrastructure resources comprise virtualized network resources representing virtualization of the network resources and virtualized service resources representing virtualization of the service resources; and managing, by the apparatus, the virtualized infrastructure resources based on the virtualized infrastructure information describing the virtualized infrastructure resources.

20. A network element, comprising:

a processor and a memory communicatively connected to the processor, the processor configured to:

receive, from a network system, a message comprising a virtualized infrastructure resource data structure comprising virtualized infrastructure resource information for a virtualized infrastructure resource hosted by the network element, the virtualized infrastructure resource data structure identifying a set of entities including a set of multiple owners of the virtualized infrastructure resource and further including a set of multiple tenants of the virtualized infrastructure resource that have a hierarchical management relationship for the virtualized infrastructure resource, the virtualized infrastructure resource data structure including a first set of fields configured to support management of the virtualized infrastructure resource by the set of multiple owners and a second set of fields configured to support hierarchical management of the virtualized infrastructure resource by the set of multiple tenants based on association of respective ones of the fields of the second set of fields with respective levels of a tenant hierarchy for the set of multiple tenants, the virtualized infrastructure resource comprising a virtualized network resource or a virtualized service resource; and initiate configuration of the network element based on the virtualized infrastructure resource information for the virtualized infrastructure resource hosted by the network element.

21. An apparatus, comprising:
at least one processor; and
at least one memory including computer program code;
wherein the at least one memory and the computer program code are configured to, with the at least one processor, cause the apparatus at least to:

receive, by the apparatus, infrastructure information describing infrastructure resources of a network infrastructure of a communication network, wherein the infrastructure resources includes network resources and service resources;

process, by the apparatus based on a set of infrastructure virtualization data structures, the infrastructure information to provide virtualized infrastructure information describing virtualized infrastructure resources of a virtualized network infrastructure of the communication network, wherein the virtualized infrastructure resources include virtualized network resources representing virtualization of the network resources and virtualized service resources representing virtualization of the service resources;

support, by the apparatus, management of the virtualized infrastructure resources based on the virtualized infrastructure information describing the virtualized infrastructure resources; and provide, by the apparatus, a set of virtualized infrastructure management applications configured for use in managing the virtualized infrastructure resources and including, for one of the virtualized infrastructure management applications, a first customized version of the one of the virtualized infrastructure management applications for a first tenant and a second customized version of the one of the virtualized infrastructure management applications for a second tenant.

* * * * *